US006217231B1

(12) United States Patent
Mesaki et al.

(10) Patent No.: US 6,217,231 B1
(45) Date of Patent: Apr. 17, 2001

(54) OPTICAL FIBER ASSEMBLY, OPTICAL MODULE INCLUDING AN OPTICAL FIBER ASSEMBLY, AND A MANUFACTURING PROCESS THEREOF

(75) Inventors: Akitoshi Mesaki; Takashi Yamane, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/038,096

(22) Filed: Mar. 11, 1998

(30) Foreign Application Priority Data

Apr. 23, 1997 (JP) .................................... 9-106275

(51) Int. Cl.[7] .................................................... G02B 6/36
(52) U.S. Cl. ................. 385/88; 385/49; 385/78; 385/89; 385/14
(58) Field of Search .................. 385/49, 88, 92, 385/90, 78

(56) References Cited

U.S. PATENT DOCUMENTS

| 4,818,056 | | 4/1989 | Enochs et al. | 385/88 |
| 4,874,217 | * | 10/1989 | Janssen | 385/91 |
| 5,071,215 | * | 12/1991 | Hockaday | 385/49 |
| 5,684,902 | | 11/1997 | Tada | 385/88 |
| 5,703,980 | * | 12/1997 | MacElwee et al. | 385/49 |
| 5,764,836 | * | 6/1998 | Roff | 385/88 |
| 5,854,868 | * | 12/1998 | Yoshimura et al. | 385/50 |

FOREIGN PATENT DOCUMENTS

| 2 203 853 | 10/1988 | (GB) . |
| 62-3211 | 1/1984 | (JP) . |
| 63-253315 | 10/1988 | (JP) . |
| 7-174940 | 7/1995 | (JP) . |
| 9-222533 | 8/1997 | (JP) . |

OTHER PUBLICATIONS

Yamada et al., "Recent Progress in Optical Hybrid Integration Using PLC Platform", *Technical Report of IECE,* EMD96–24, CPM96–47, OPE96–46, LGE96–48, 1996–08, pp. 1–6.

Nishikawa, T. et al., "Surface Mounting LD Module on a Silicon Substrate", IECE 1997 Annual Meeting, C–3–63, p. 248.

Asakawa et al., "Novel PLC Connector with Fiber Physical Contact", *OFC '97 Technical,* WL29, p. 190.

* cited by examiner

*Primary Examiner*—Rodney Bovernick
*Assistant Examiner*—Juliana K. Kang
(74) *Attorney, Agent, or Firm*—Staas & Halsey, LLP

(57) ABSTRACT

An optical fiber assembly includes a substrate carrying an optical device and a ferrule having a cutout surface, wherein the substrate is mounted on the ferrule such that a principal surface of the substrate engages a corresponding flat cutout surface of the ferrule. Further, an optical module that uses such an optical fiber assembly is disclosed.

25 Claims, 22 Drawing Sheets

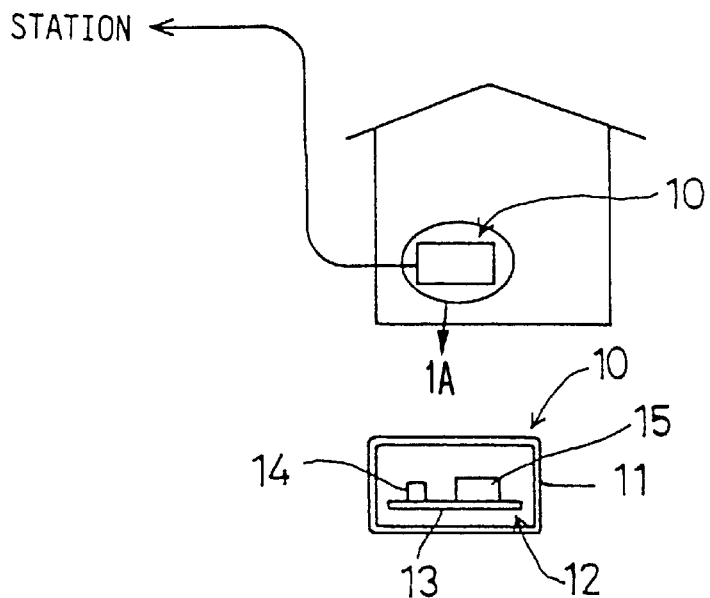
FIG. 1 PRIOR ART
FIG. 1A PRIOR ART
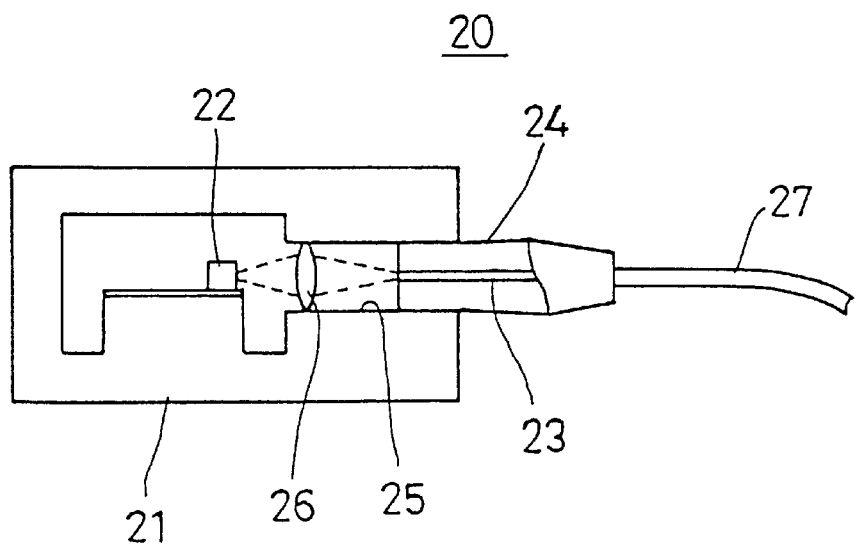
FIG. 2 PRIOR ART

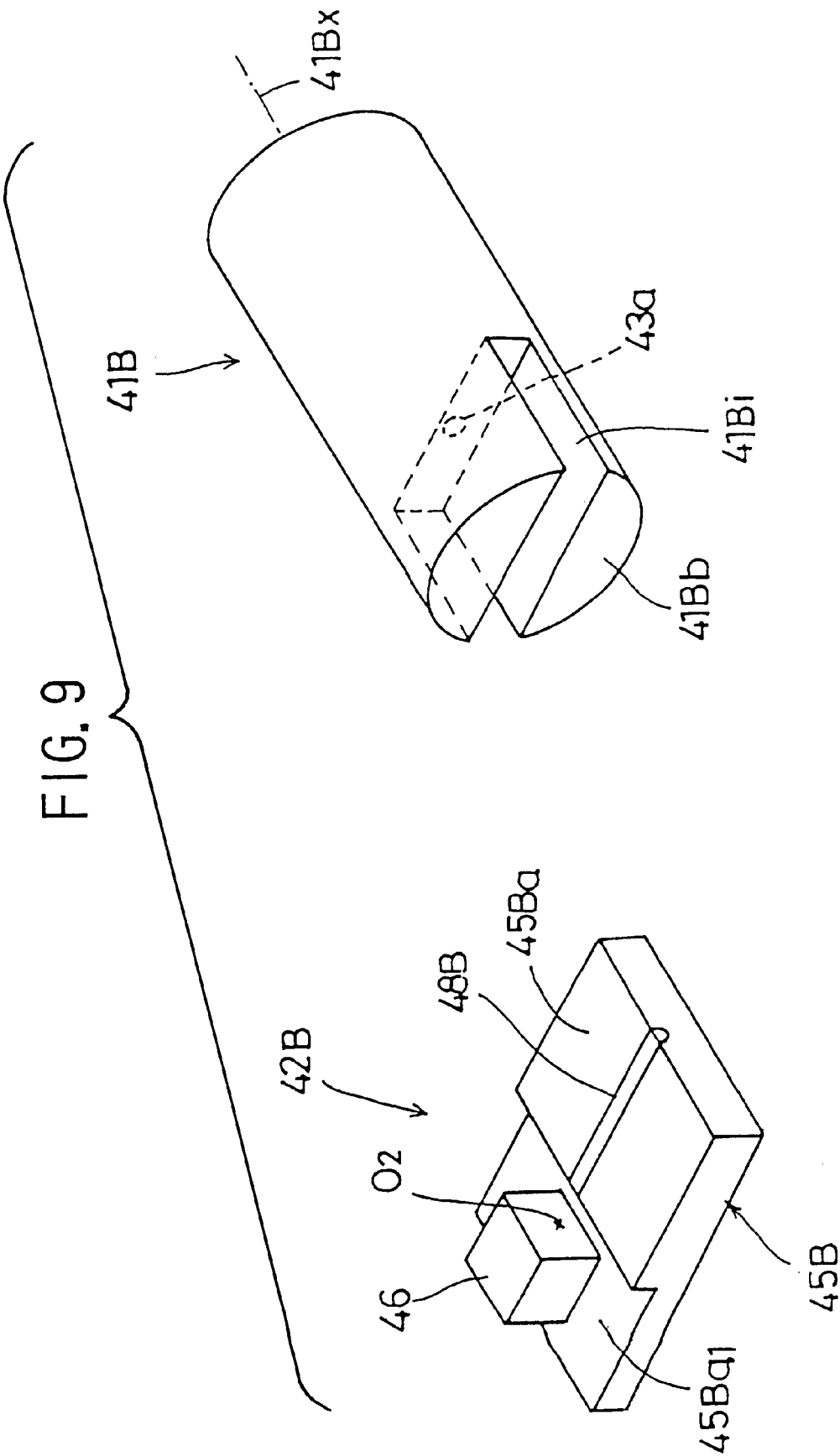

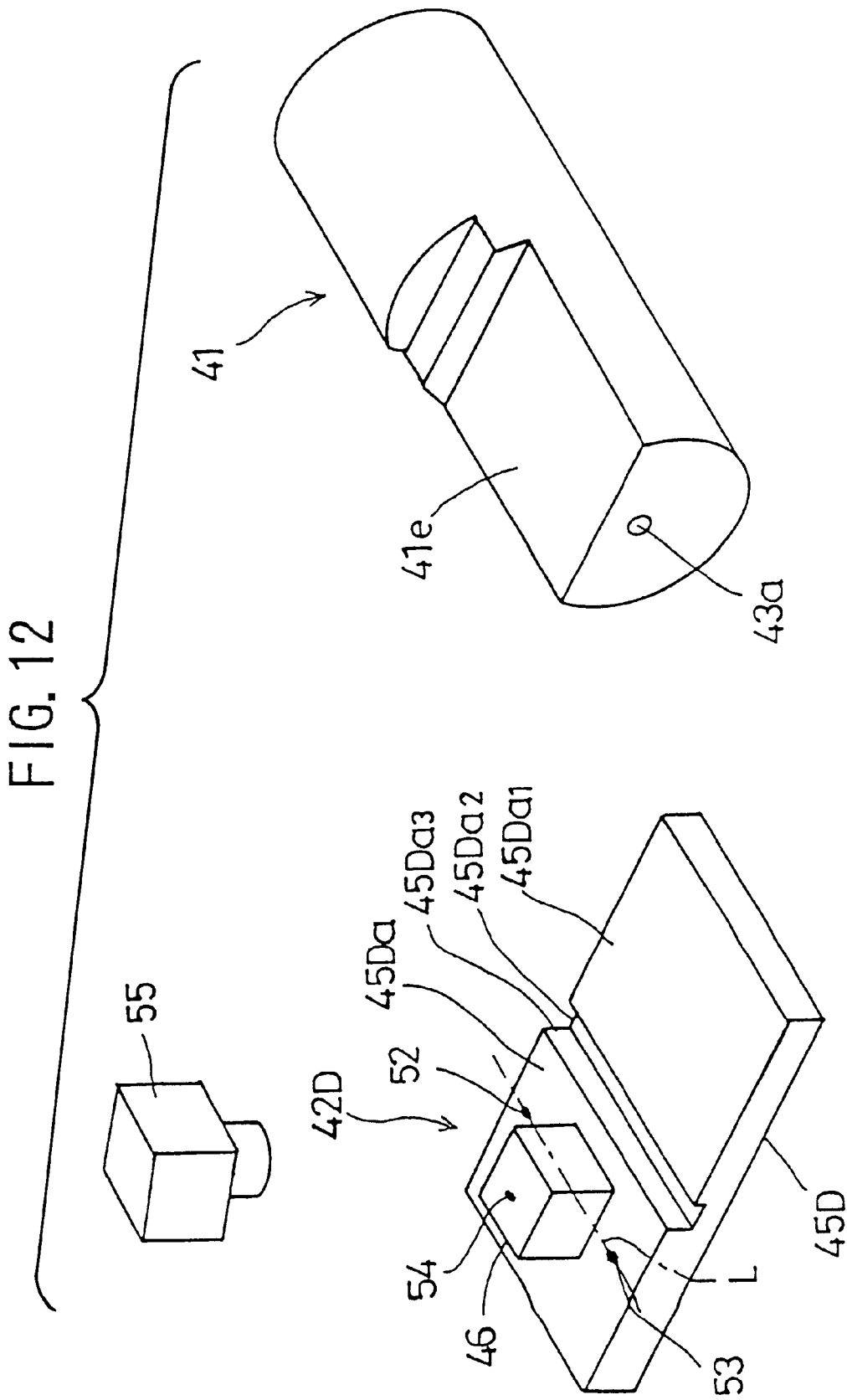

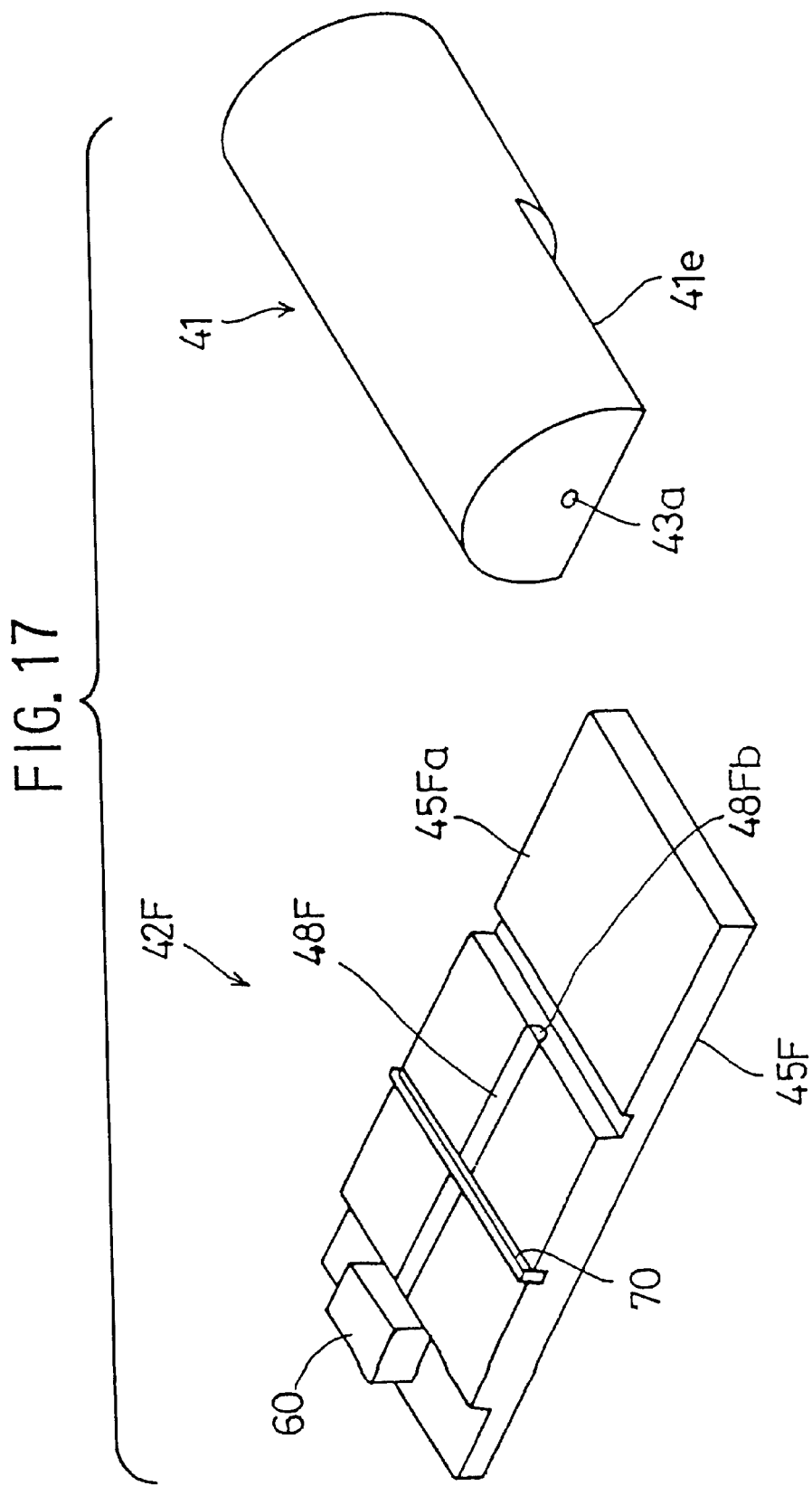

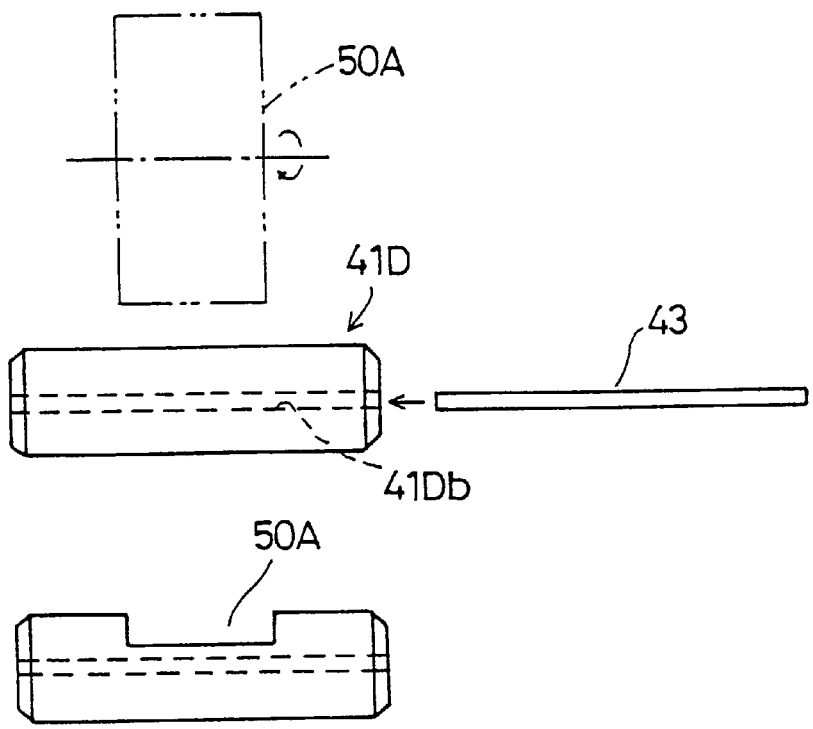
FIG. 24A
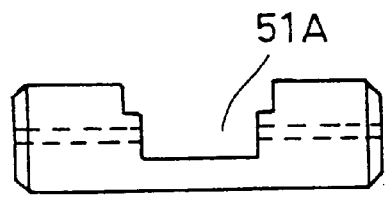
FIG. 24B
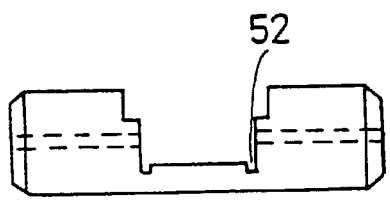
FIG. 24C
FIG. 24D
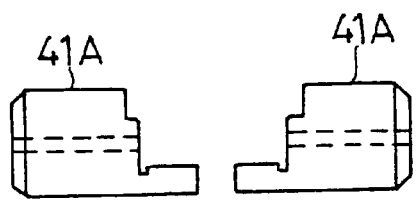
FIG. 24E

OPTICAL FIBER ASSEMBLY, OPTICAL MODULE INCLUDING AN OPTICAL FIBER ASSEMBLY, AND A MANUFACTURING PROCESS THEREOF

BACKGROUND OF THE INVENTION

The present invention relates to an optical fiber assembly, an optical module including an optical fiber assembly, and a manufacturing process thereof.

With wide spreading use of optical telecommunication in human society, there is an increasing impetus to deploy optical subscriber systems including optical home terminals.

FIG. 1 shows the construction of a typical optical home terminal 10.

Referring to FIG. 1, the optical home terminal 10 includes a housing 11 in which a circuit assembly 12 is accommodated. The circuit assembly 12 includes a printed circuit board 13 carrying thereon various electronic components 14 and an optical fiber assembly 15. In order to reduce the cost of the optical home terminal 10, it is desired to mount the optical fiber assembly 15 and the electronic components 14 on the printed circuit board 13 by a solder reflowing process. Further, it is desired to reduce the cost of the optical fiber assembly as much as possible.

FIG. 2 shows the construction of a conventional optical fiber assembly 20.

Referring to FIG. 2, the optical fiber assembly 20 includes a housing 21 accommodating therein an optical device 22. The housing 21 includes a through-hole 25, and a ferrule 24 provided at an end of an optical fiber 23 is fitted into the through-hole 25. Further, a lens 26 is disposed between the foregoing end of the optical fiber 23 and the optical device 22 in the housing 21. Thereby, an optical fiber cable 27 extends outside the housing 21.

In operation, the optical beam emitted by the optical device 22 is injected into the optical fiber 23 after being focused by the lens 26. Further, the optical beam exited from the foregoing optical fiber end is focused upon the optical device 22 by way of the lens 26.

FIGS. 3A and 3B show another conventional optical fiber assembly 30.

Referring to FIGS. 3A and 3B, the optical fiber assembly 30 includes a housing 31 in which a block 32, a ferrule 33 and a split sleeve 34 are accommodated, wherein the block 32 includes a V-shaped groove 32a and a flat top surface 32b for carrying an optical device 35. The ferrule 33 holds therein an optical fiber 36 such that a free end part of a bare optical fiber extends from the ferrule 33. Thereby, the bare optical fiber 36 thus extending from the ferrule 33 is held by the V-shaped groove 32a such that the end of the optical fiber 36 faces the optical device 35 within an error of ±1 μm. As noted already, the ferrule 33 is held by the split sleeve 34.

Further, a ferrule 37 of an optical connector is inserted into the housing 31 for a fitting engagement with the split sleeve 34.

In the construction of FIG. 2, there is a drawback in that the optical fiber assembly 20 cannot be mounted on a printed circuit board by a solder reflowing process because of the existence of the optical fiber cable 27 extending from the optical fiber assembly 20. Thus, it has been necessary to mount the optical fiber assembly 20 manually on the printed circuit board, while such a manual mounting process increases the cost of the optical home terminal. In addition, the optical fiber assembly 20, using the lens 26 therein, has a complex structure and the assembling process thereof is difficult. In other words, the construction of the optical fiber assembly 20 itself is disadvantageous for reducing the cost of the optical home terminal.

On the other hand, the optical fiber assembly 30 of FIGS. 3A and 3B, lacking the optical fiber cable extending therefrom in the outward direction, can be mounted on a printed circuit board successfully by using a solder reflowing process. On the other hand, the optical fiber assembly 30 has a drawback in the point that the bare optical fiber 36 having a diameter of only 125 μm may be damaged when assembling the optical fiber assembly 30. Thus, the yield of the optical fiber assembly 30 is tend to be deteriorated and the cost of the optical home terminal is increased.

While it is possible to construct such that the ferrule 33 engages the V-shaped groove 32a, such a construction cannot provide the necessary accuracy of positioning the optical fiber in view of the fact that the ferrule 33 has a diameter of 1–2.5 mm and cannot be positioned precisely within the error of ±1 μm by engaging with the V-shaped groove 32a. Further, it is difficult to form the V-shaped groove 32a with a size of 1 mm or more for accepting the ferrule 33 while still maintaining the foregoing precision of ±1 μm.

SUMMARY OF THE INVENTION

Accordingly, it is a general object of the present invention to provide a novel and useful optical fiber assembly and a manufacturing process thereof wherein the foregoing problems are eliminated.

Another and more specific object of the present invention is to provide an optical fiber assembly in which the necessary optical alignment between an optical fiber and an optical device is achieved easily and efficiently with high precision.

Another object of the present invention is to provide an optical module including an optical fiber assembly in which the optical module can be mounted on an external printed circuit board by way of a solder reflowing process.

Another object of the present invention is to provide an optical fiber assembly, comprising:

a substrate having a principal surface;

an optical device provided on said substrate;

a ferrule carrying an optical fiber, said ferrule being defined by a circumferential surface;

said ferrule including a cutout part on said circumferential surface, said cutout part including a flat cutout surface formed on said circumferential surface so as to extend in an axial direction of said ferrule;

said substrate being mounted on said flat cutout surface such that said principal surface engages said flat cutout surface.

Another object of the present invention is to provide an optical fiber assembly, comprising:

a substrate defined by first and second, mutually opposing principal surfaces;

an optical device provided on said substrate; and a ferrule having an end surface and carrying therein an optical fiber, said ferrule having a cut-in part on said end surface, said cut-in part being defined by a pair of mutually parallel surfaces and a rear surface exposing an end surface of said optical fiber;

said substrate being inserted into said cut-in part such that said first and second principal surfaces of said substrate engage said parallel surfaces of said cut-in part respectively, said optical device and said exposed end surface of said optical fiber being aligned optically.

Another object of the present invention is to provide an optical fiber assembly, comprising:

a ferrule carrying an optical fiber, said ferrule having a circumferential surface;

a cutout part provided on said circumferential surface of said ferrule, said cutout part being defined by a flat cutout surface and a cutout end surface, said cutout end surface exposing an end surface of said optical fiber; and an optical device provided on said flat cutout surface in optical alignment with said exposed end surface of said optical fiber.

According to the present invention, it is possible to achieve an optical alignment between the optical device on the substrate and the optical fiber held by the ferrule by providing the cutout part to the ferrule. As the optical fiber is protected by the ferrule, the risk that the optical fiber is damaged by the process of optical engagement is minimized. By engaging the principal surface of the substrate and the cutout surface of the ferrule, the optical alignment of the optical device and the optical fiber held in the ferrule is achieved easily and efficiently with high precision. Alternatively, the optical device may be provided directly on such a cutout surface of the ferrule.

Another object of the present invention is to provide an optical module, comprising:

a housing including a first region and a second region;

an optical assembly accommodated in said first region of said housing, said optical assembly comprising: a substrate having a principal surface; an optical device provided on said substrate; a ferrule carrying an optical fiber, said ferrule being defined by a circumferential surface; said ferrule including a cutout part on said circumferential surface, said cutout part including a flat cutout surface formed on said circumferential surface so as to extend in an axial direction of said ferrule; said substrate being mounted on said flat cutout surface such that said principal surface engages said flat cutout surface;

a holder member provided on said second region of said housing, said holder member holding a second end of said ferrule including said second end surface and adapted to hold another ferrule provided at an end of an external optical fiber in an abutting engagement with said second end surface; and electrical contacts provided on said housing for external connection;

said second region of said housing including an opening adapted for accepting an optical plug carrying said another ferrule and said external optical fiber, said second region of said housing guiding said optical plug inserted into said opening.

According to the present invention, it becomes possible to construct the optical module such that the external optical fiber is detachable from the ferrule that is fixed inside the optical module in optical alignment with the optical device. Thereby, the optical module can be successfully mounted on a printed circuit board by a solder reflowing process, and the cost of the optical home terminal is reduced significantly. As the external optical fiber is held by a ferrule that is accepted by the holder member on the housing, a reliable and reproducible optical alignment is guaranteed between the optical device in the optical module and the external optical fiber.

Another object of the present invention is to provide a method of manufacturing an optical assembly, said optical assembly comprising: a substrate having a principal surface; an optical device provided on said substrate; a ferrule carrying an optical fiber, said ferrule being defined by a circumferential surface; said ferrule including a cutout part on said circumferential surface, said cutout part including a flat cutout surface formed on said circumferential surface so as to extend in an axial direction of said ferrule; said substrate being mounted on said flat cutout surface such that said principal surface engages said flat cutout surface; said method comprising the steps of:

mounting said optical device on said principal surface of said substrate; and mounting said substrate on said ferrule such that said flat surface of said ferrule engages said principal surface of said substrate;

said step of mounting said optical device including the steps of: recognizing a positioning mark on said substrate and a positioning mark on said optical device by way of a first image recognition process; and positioning said optical device with respect to said substrate based upon a result of said image recognition process;

said step of mounting said substrate on said ferrule the steps of: recognizing a positioning mark on said substrate and an end of said optical fiber held by said ferrule by way of a second image recognition process; and positioning said ferrule with respect to said substrate based upon a result of said image recognition process.

According to the present invention, the desired optical alignment between the optical device and the optical fiber is achieved easily by way of applying an image recognition process.

Other objects and further features of the present invention will become apparent from the following detailed description when read in conjunction with the attached drawings.

BRIEF DESCRIPTION OF THE DRAWINGS

FIG. 1 is a diagram showing the concept of an optical subscriber system;

FIG. 2 is a diagram showing the construction of a conventional optical fiber assembly;

FIG. 9 is another diagram showing the construction of the optical fiber assembly of the third embodiment in an exploded view;

FIG. 12 is another diagram showing the construction of the optical fiber assembly of the fifth embodiment in an exploded view;

FIG. 17 is another diagram showing the construction of the optical fiber assembly of the seventh embodiment in an exploded view;

FIGS. 24A–24E are diagrams showing the process of manufacturing a ferrule used in the second embodiment.

DETAILED DESCRIPTION OF THE PREFERRED EMBODIMENTS

[FIRST EMBODIMENT]

Figure 3A:
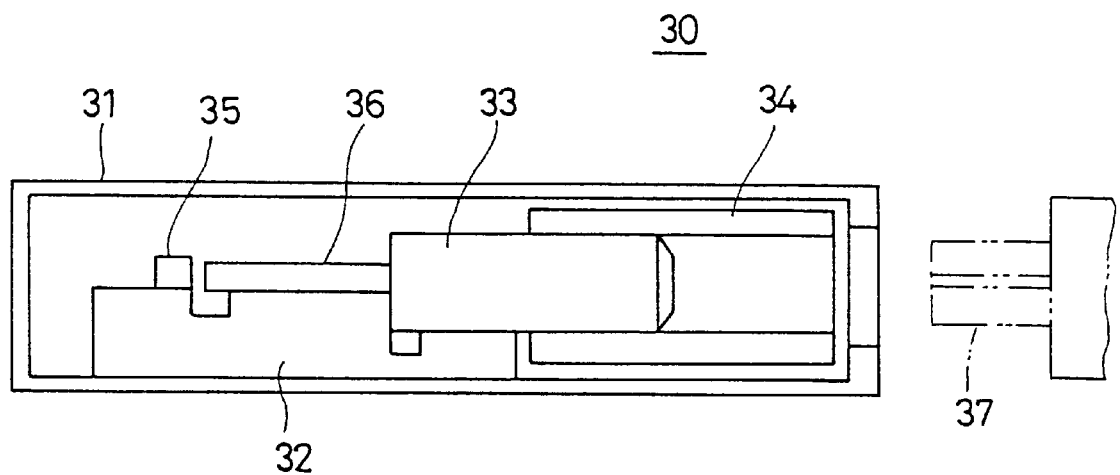
FIGS. 3A and 3B are diagrams showing another conventional optical fiber assembly.
Figure 3B:
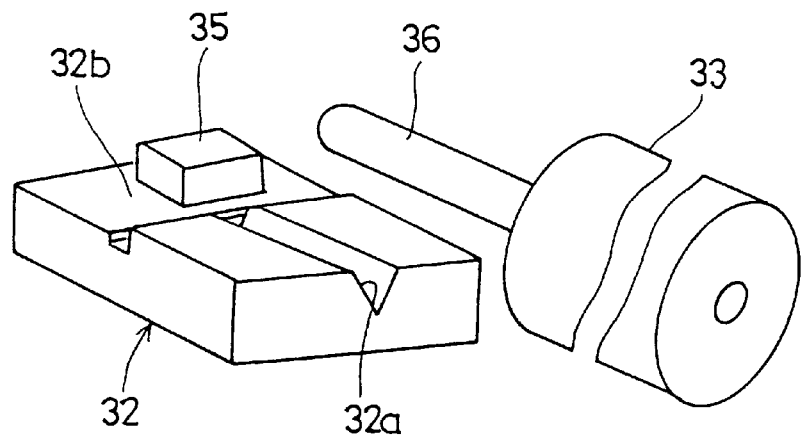
Figure 4A:
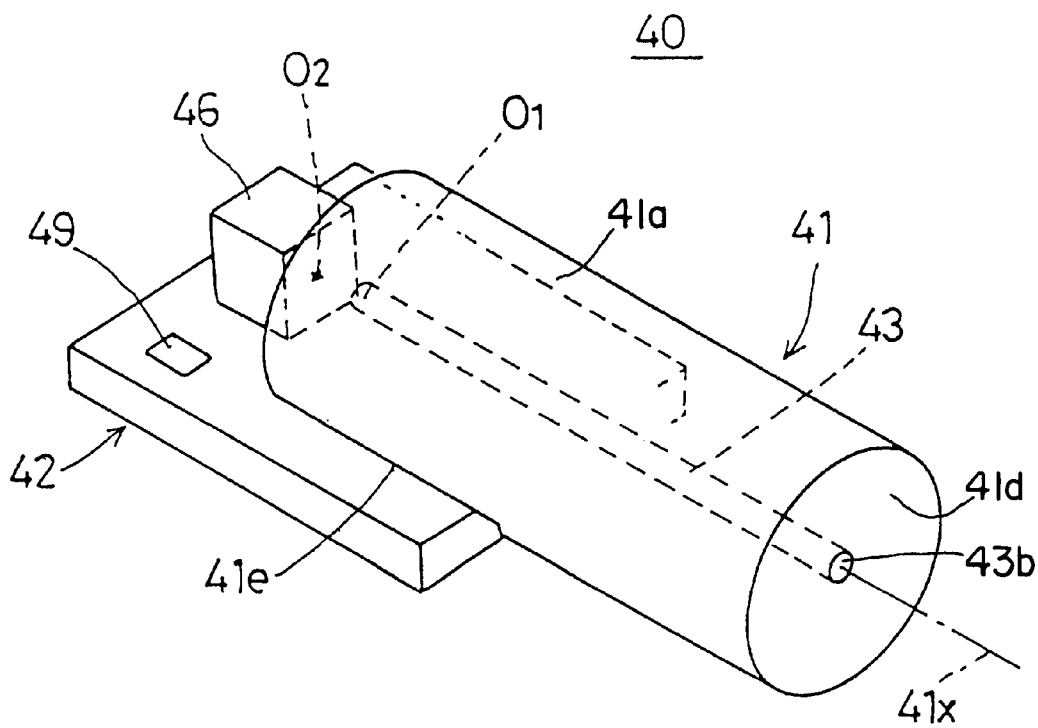
FIGS. 4A and 4B are diagrams showing the construction of an optical fiber assembly according to a first embodiment of the present invention.
Figure 4B:
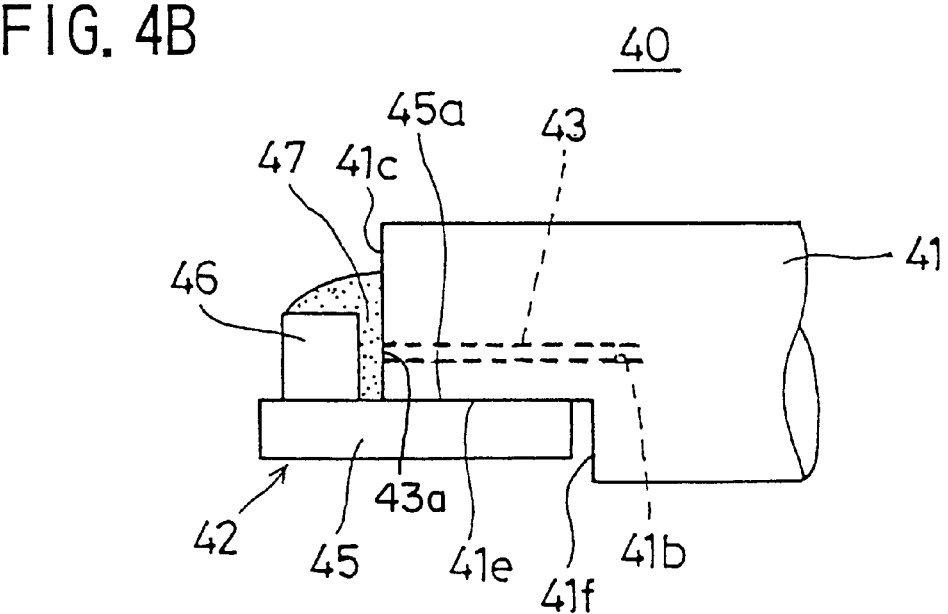
Figure 5:
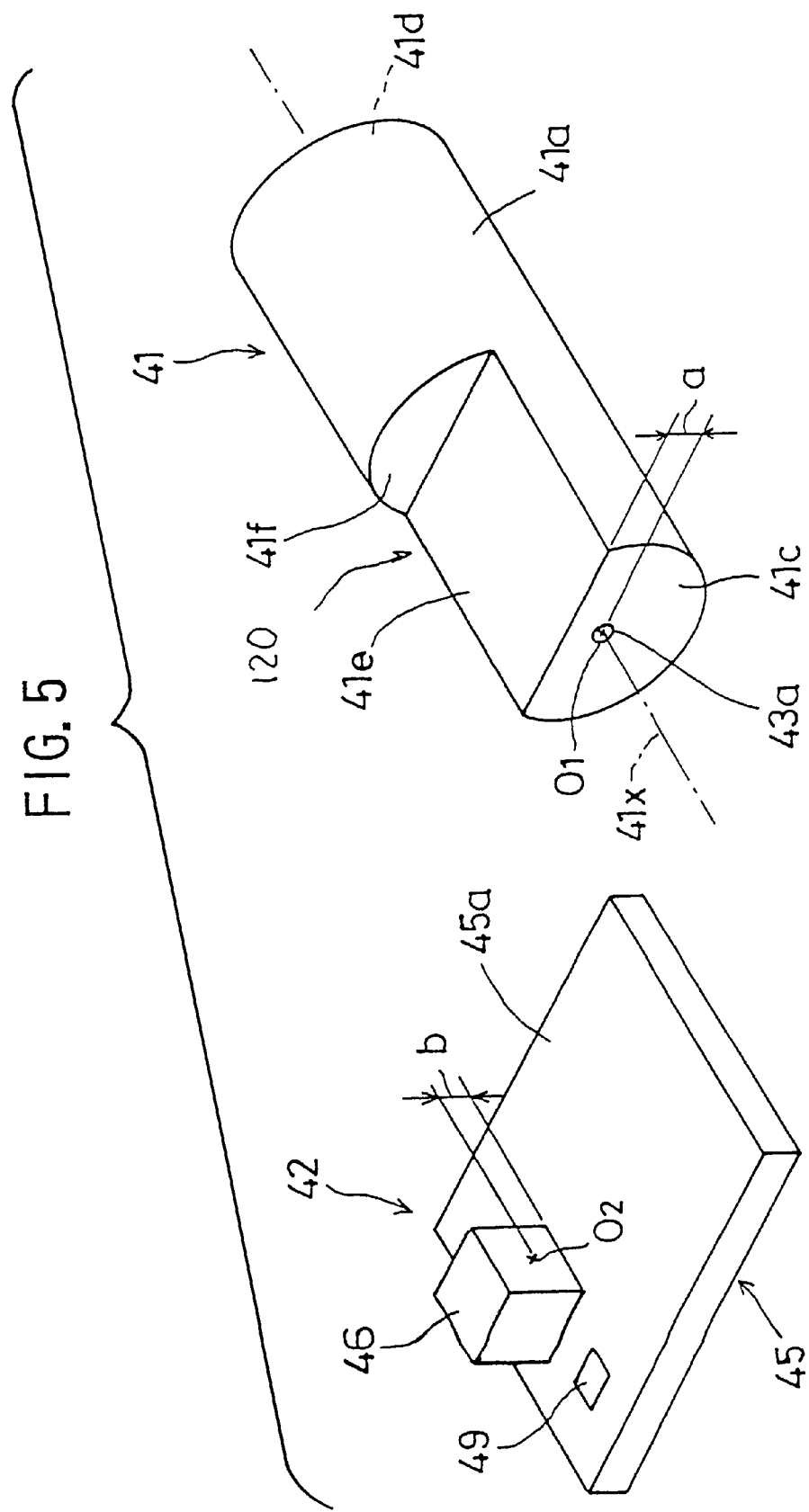
FIG. 5 is another diagram showing the construction of the optical fiber assembly of the first embodiment in an exploded view.

FIGS. 4A and 4B are diagrams showing the construction of an optical fiber assembly 40 according to a first embodiment of the present invention. Further, FIG. 5 shows the optical fiber assembly 40 in an exploded view.

Referring to the drawings, the optical fiber assembly 40 includes a ferrule 41 carrying an optical fiber 43 and a laser diode assembly 42 in which a laser diode 46 is supported on a substrate 45.

The ferrule 41 is formed of a zirconia ceramic and has a generally cylindrical form defined by a circumferential surface 41a of a circular cross section. The optical fiber 43 extends in an axial direction of the ferrule 41 along a central hole 41b thereof. It should be noted that the ferrule 41 has a cutout 120 at an end part including an end surface 41c (see FIG. 5), wherein the end part 120 in turn includes a flat cutout surface 41e extending in the axial direction of the ferrule 41 and also another end surface 41f extending in a radial direction from the circumferential surface. As a result of the formation of the cutout 120, the end surface 41c has a generally semi-circular shape including the central hole 41b. Further, the optical fiber 43 is mounted on the ferrule 41 such that an end surface 43a of the optical fiber 43 forms a flush surface with the end surface 41c of the ferrule 41. It should be noted that the flat cutout surface 41e is offset from a central axis 41x of the ferrule 41 by a distance a, wherein the distance a is determined with a submicron precision.

Further, the foregoing another end surface 41f has a small semicircular shape, wherein the semicircular end surface 41f and the semicircular end surface 41c form together a whole circle when viewed from a front direction of the ferrule 41.

As noted already, the end surface 43a of the optical fiber 43 and the end surface 41c of the ferrule 41 form a flush surface. Similarly, an end surface 43b of the optical fiber 43 opposite to the end surface 43a forms a flush surface to an end surface 41d of the ferrule 41, which is opposite to the end surface 41c. Thereby, the entire length of the optical fiber 43 is protected by the ferrule 41 and the risk that the optical fiber 43 is damaged when assembling the optical fiber assembly 40 is successfully avoided.

It should be noted that the substrate 45 forming the laser diode assembly 42 is formed of Si, and the laser diode 46 is mounted on a mirror-flat principal surface 45a of the substrate 45 by a Au—Sn solder alloy. Thereby, a center $O_2$ of the optical beam produced by the laser diode 46 and emitted from an edge surface thereof is located at a height b with respect to the foregoing principal surface 45a of the substrate 45. The laser diode 46 is fabricated by a photolithographic process and has an outer dimension determined with a submicron precision. The foregoing distance or offset a of the flat surface 41e is set equal to the foregoing height b with a submicron precision.

As noted already, the ferrule 41 is mounted on the laser diode assembly 42 by engaging the flat cutout surface 41e of the ferrule 41 with the principal surface 45a of the substrate 45, wherein the substrate 45 and the ferrule 41 are fixed with each other by a Au—Sn solder alloy after appropriate positioning. In such a structure, the error between a center $O_1$ of the optical fiber 43 exposed at the end surface 41c of the ferrule 41 and coincident to the central axis 41x of the ferrule 41 and the center $O_2$ of the optical beam on the edge surface of the laser diode 46 is held within about 1 μm.

While the foregoing soldering process does cause a heating of the optical fiber 43, such a heating of the optical fiber 43 is conducted only for a short duration, with a relatively low temperature of about 200° C. Thus, the heating of the optical fiber 43 does not cause a substantial damage to the optical fiber 43. It is also possible to use a thermosetting adhesive such as an epoxy resin in place of the Au—Sn solder alloy.

The gap between the laser diode 46 and the end surface 41c of the ferrule 41, in other words the end surface 43a of the optical fiber 43, is filled by a resin 47, wherein the resin 47 is used for matching the refractive index between the laser diode 46 and the optical fiber 43. In view of the fact that the foregoing gap is in the order of 1 μm, and further in view of the fact that the foregoing gap is filled by the resin 47, the optical beam produced by the laser diode 46 is efficiently injected into the optical fiber 43 at the end surface or optical fiber edge 43a.

The substrate 45 further carries a land 49 at a suitable location for external electrical connection.

It should be noted that the laser diode 46 may be replaced by a photodiode. Further, the ferrule 41 may be formed of stainless steel.

[SECOND EMBODIMENT]

Figure 6A:
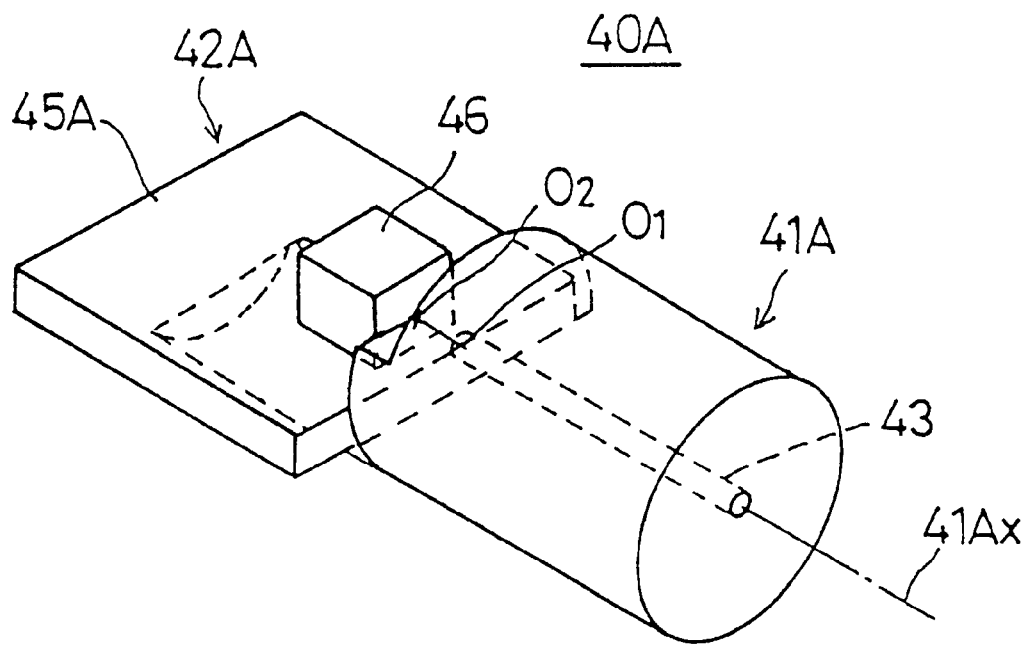
FIGS. 6A and 6B are diagrams showing the construction of an optical fiber assembly according to a second embodiment of the present invention.
Figure 6B:
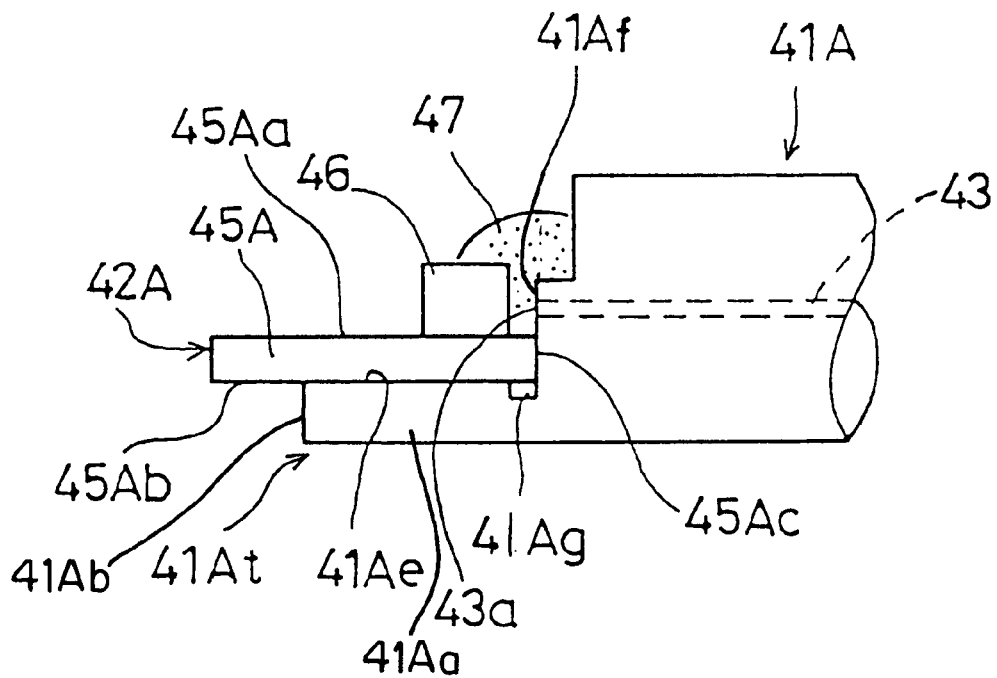

FIGS. 6A and 6B show an optical fiber assembly 40A according to a second embodiment of the present invention.

Figure 7:
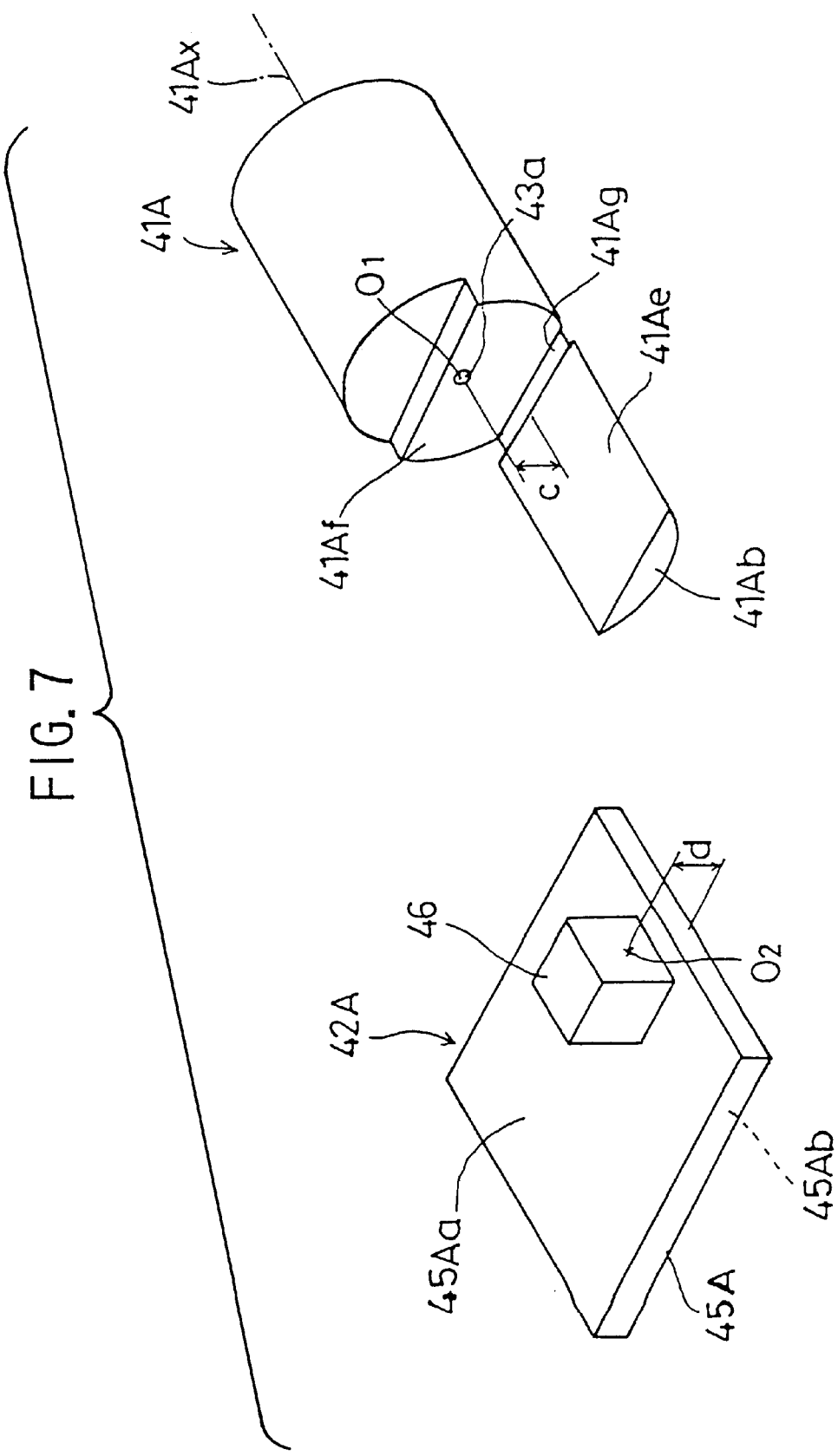
FIG. 7 is another diagram showing the construction of the optical fiber assembly of the second embodiment in an exploded view.

Further, FIG. 7 shows the optical fiber assembly 40A in an exploded view. In the drawing, those parts corresponding to the parts described previously are designated by the same reference numerals and the description thereof will be omitted.

Referring to the drawings, the optical fiber assembly 40A includes a ferrule 41A and a laser diode assembly 42A in place of the ferrule 41 and the laser diode assembly 42, wherein the ferrule 41A includes a tongue part 41At in a front end part thereof including a stopper surface 41Af, such that the foregoing tongue part 41At is defined by a flat top surface 41Ae and a circular circumferential wall 41Aa of the ferrule 41A. The tongue part 41At projects in the forward direction and is defined further by a front end surface 41Ab. It should be noted that the flat surface 41Ae is parallel to a central axis 41Ax of the ferrule 41A. The stopper surface 41Af includes the central axis 41Ax, and the front end surface 43a of the optical fiber 43 is exposed at the stopper surface 41Af in correspondence to the foregoing central axis 41Ax.

On the other hand, the laser diode assembly 42A includes a silicon substrate 45A having a principal surface 45Aa, wherein the laser diode 46 is mounted on the foregoing principal surface 45Aa. Further, the ferrule 41A is mounted on the laser diode assembly 42A in a state that an end surface 45Ac of the substrate 45A engages the stopper surface 41Af of the ferrule 41A and such that a bottom principal surface 45Ab of the substrate 45A engages the flat surface 41Ae of the ferrule 41A.

The optical fiber assembly 41A and the laser diode assembly 42A are formed such that a distance c between the flat surface 41Ae and the center $O_1$ of the end surface 43a of the optical fiber 43 (see FIG. 7A) is generally equal to a distance d between the center $O_2$ of the optical beam of the laser diode 46 at the laser diode edge surface and the bottom principal surface 45Ab of the substrate 45. Thereby, the error between the distance c and the distance d is suppressed below 1 $\mu$m (submicrons). The distance between the center $O_1$ of the end surface 43a of the optical fiber 43 and the center $O_2$ of the optical beam at the edge surface of the edge-emission type laser diode 46 is set within about 1 $\mu$m.

In addition, it should be noted that a groove 41Ag is formed in the tongue part between the flat surface 41Ae and the stopper surface 41Af. By forming the groove 41Ag, the axial position of the stopper surface 41Af can be determined with a high precision by a mere dicing process. As the axial position of the stopper surface 41Af is thus set exactly, the axial position of the edge surface of the laser diode 46 with respect to the end surface 43a of the optical fiber 43 is determined exactly with a submicron precision. The groove 41Ag further acts as a space for absorbing excessive adhesives.

[THIRD EMBODIMENT]

Figure 8A:
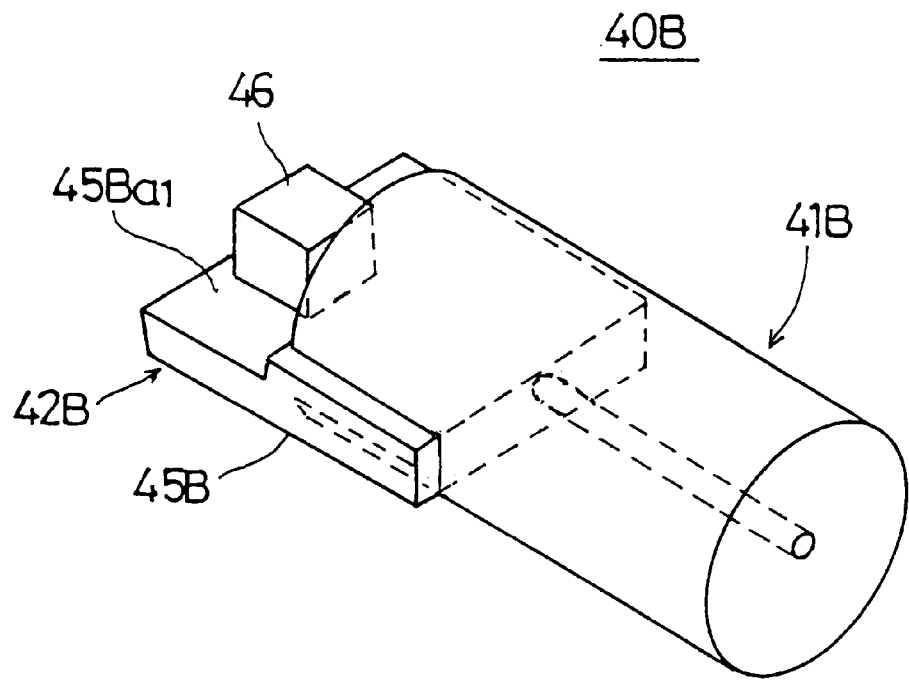
FIGS. 8A and 8B are diagrams showing the construction of an optical fiber assembly according to a third embodiment of the present invention.
Figure 8B:
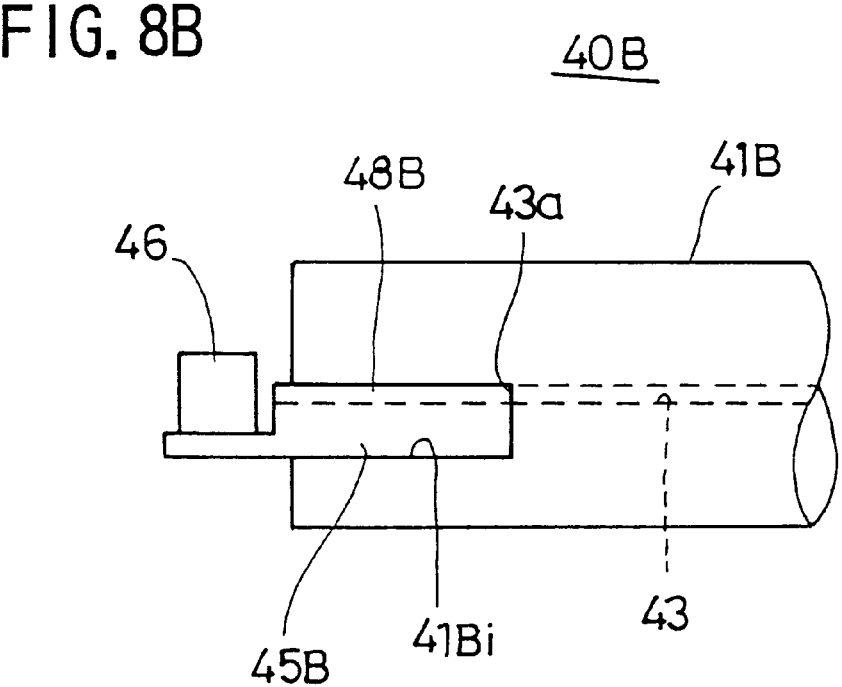

FIGS. 8A and 8B are diagrams showing an optical fiber assembly 40B according to a third embodiment of the present invention. Further, FIG. 9 shows the optical fiber assembly 40B in an exploded state. In the drawings, those parts corresponding to the parts described previously are designated by the same reference numerals and the description thereof will be omitted.

Referring to the drawings, the optical fiber assembly 40B includes a ferrule 41B and a laser diode assembly 42B in place of the ferrule 41 or 41A and the laser diode assembly 42 or 42A, wherein the ferrule 41B includes a slit 41Bi in an end part thereof such that the slit 41Bi extends in an axial direction at a location including a central axis 41Bx of the ferrule 41B. The slit 41Bi is defined by a pair of parallel flat surfaces and a rear surface connecting the foregoing parallel surfaces, wherein the end surface 43a of the optical fiber 43 is exposed at the rear surface.

On the other hand, the laser diode assembly 42B includes a silicon substrate 45B having a principal surface 45Ba, wherein the silicon substrate 45B carries an optical waveguide 48B on the principal surface 45Ba, in addition to the laser diode 46. The laser diode 46 is provided on a depressed region 45Ba1 formed behind the principal surface 45Ba, such that the center $O_2$ of the optical beam at the edge surface of the laser diode 46 aligns a first end surface of the optical waveguide 48B.

In the optical fiber assembly 40B, the substrate 45B of the laser diode assembly 42B is fitted into the slit 41Bi of the ferrule 41B, such that a second, opposite end surface of the optical waveguide 48B faces the exposed end surface 43a of the optical fiber 43. As the substrate 45B is fitted into the slit 41Bi, a firm engagement is achieved between the ferrule 41B and the optical fiber assembly 42B.

[FOURTH EMBODIMENT]

Figure 10A:
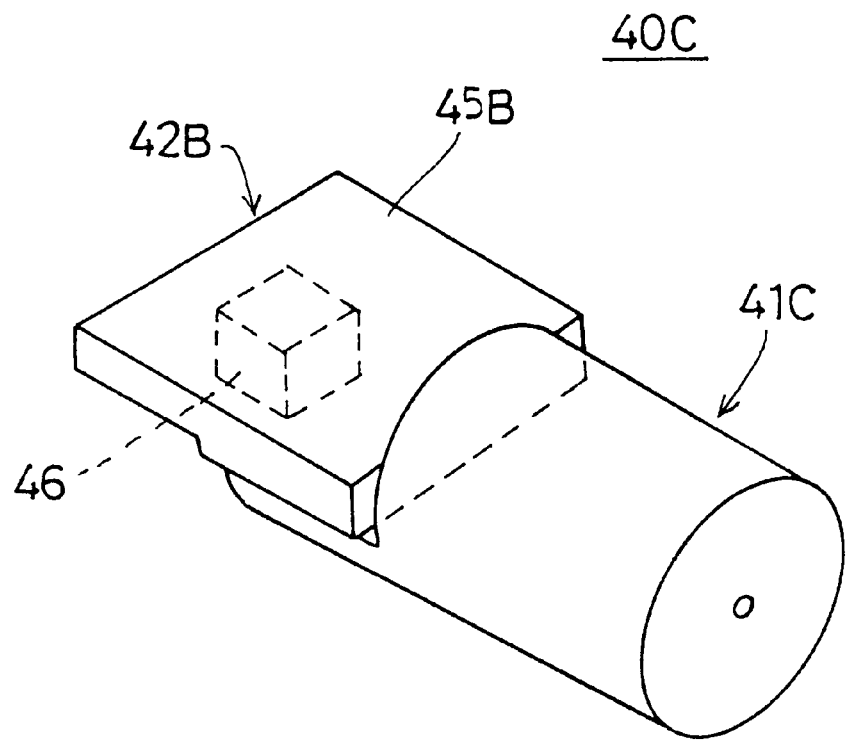
FIGS. 10A and 10B are diagrams showing the construction of an optical fiber assembly according to a fourth embodiment of the present invention.
Figure 10B:
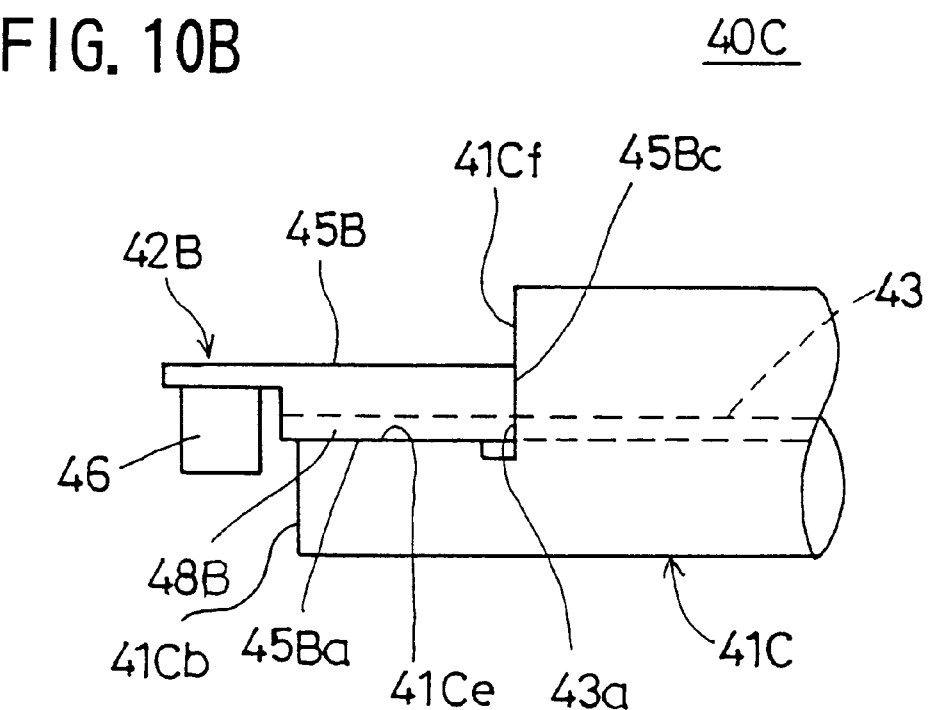

FIGS. 10A and 10B are diagrams showing an optical fiber assembly 40C according to a fourth embodiment of the present invention, wherein those parts corresponding to the parts described previously are designated by the same reference numerals and the description thereof will be omitted.

Referring to FIGS. 10A and 10B, the optical fiber assembly 40C includes a ferrule 41C in combination with the laser diode assembly 41B of FIG. 9, wherein the ferrule 41C includes a flat cutout surface 41Ce at an end part thereof including an end surface 41Cb. The ferrule 41C further includes a stopper surface 41Cf, with a groove intervening therebetween, such that the stopper surface 41Cf exposes the end surface 43a of the optical fiber 43 held in the ferrule 41C.

The ferrule 41C is mounted upon the laser diode assembly 42B in such a manner that the upper principal surface 45Ba of the substrate 45B is abutted to the foregoing flat cutout surface 41Ce of the ferrule 41C and such that the end surface 45Bc of the substrate 45B is abutted to the foregoing stopper surface 4lCf. By mounting the substrate 45B upon the ferrule 41C as such, an end surface of the optical waveguide 48B on the substrate 45B faces the exposed end surface 43a of the optical fiber 43. By providing the optical waveguide 48B on the substrate 45B, it becomes possible to provide the laser diode 46 with an arbitrary distance from the end surface 43a of the optical fiber 43, and the fabrication of the laser diode assembly 41C is substantially facilitated. Further, by optimizing the optical waveguide 48B on the substrate 45B, it becomes possible to mount the laser diode 46 at a convenient location on the substrate 45B.

[FIFTH EMBODIMENT]

Figure 11A:
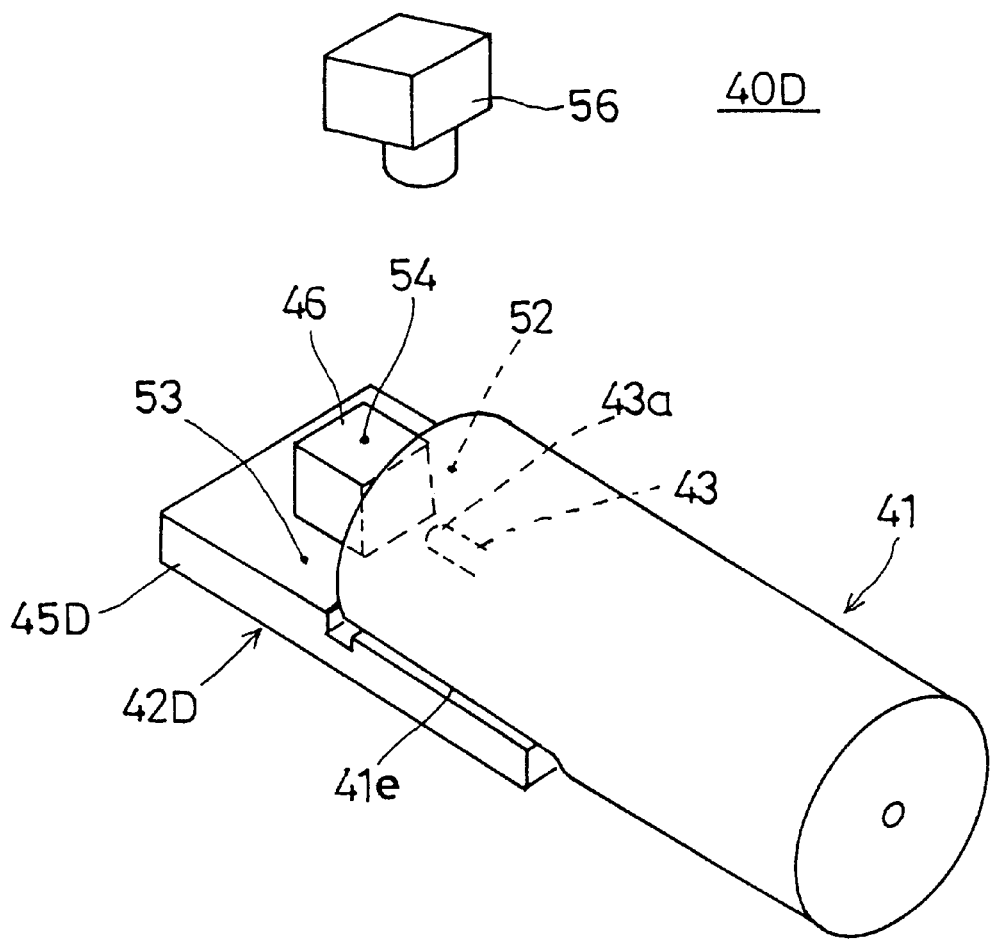
FIGS. 11A and 11B are diagrams showing the construction of an optical fiber assembly according to a fifth embodiment of the present invention.
Figure 11B:
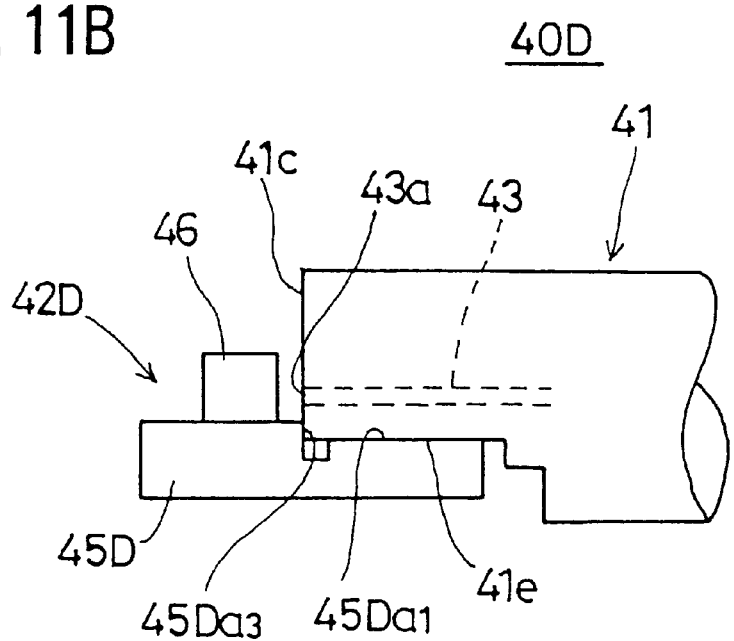

FIGS. 11A and 11B show the construction of an optical fiber assembly 40D according to a fifth embodiment of the present invention. Further, FIG. 6 shows the optical fiber assembly 40D in an exploded view. In the drawings, those parts corresponding to the parts described previously are designated by the same reference numerals and the description thereof will be omitted.

Referring to the drawings, the optical fiber assembly 40D is a modification of the optical fiber assembly 40 of FIGS. 4A and 4B and uses a laser diode assembly 42D in combination with the ferrule 41, which is substantially identical to the ferrule 41 of FIGS. 4A and 4B.

It should be noted that the laser diode assembly 40D includes a substrate 45D having a principal surface 45Da and carries the laser diode 46 on the foregoing principal surface 45Da. It should be noted that the substrate 45D includes a depressed surface $45Da_1$ at a front half thereof, and a groove $45Da_2$ intervenes between principal surface 45Da and the depressed surface $45Da_1$. The principal surface 45Da is defined, at a front edge thereof, by an end surface $45Da_3$ which also defines the groove $45Da_2$.

The laser diode assembly 40 is mounted on the ferrule 41 in a state that the lower surface $45Da_1$ of the substrate 45D engages the flat cutout surface 41e of the ferrule 41 such that the end surface 43a of the optical fiber 43 faces the active region of the laser diode 46. Thereby, the front end surface $45Da_3$ engages the front end surface 41c of the ferrule 41 and acts as a stopper surface. By forming the groove $45Da_2$, the location of the stopper surface $45Da_3$ is determined precisely. Further, the groove $45Da_2$ acts to hold excessive adhesives.

Hereinafter, the manufacturing process of the optical fiber assembly will be described with reference to foregoing FIGS. 11A, 11B and FIG. 12 and further with reference to FIGS. 13A–13D, wherein those parts corresponding to the parts described previously are designated by the same reference numerals and the description thereof will be omitted.

First, the manufacturing of the ferrule 41 is described with reference to FIGS. 13A–13D.

Figure 13A:
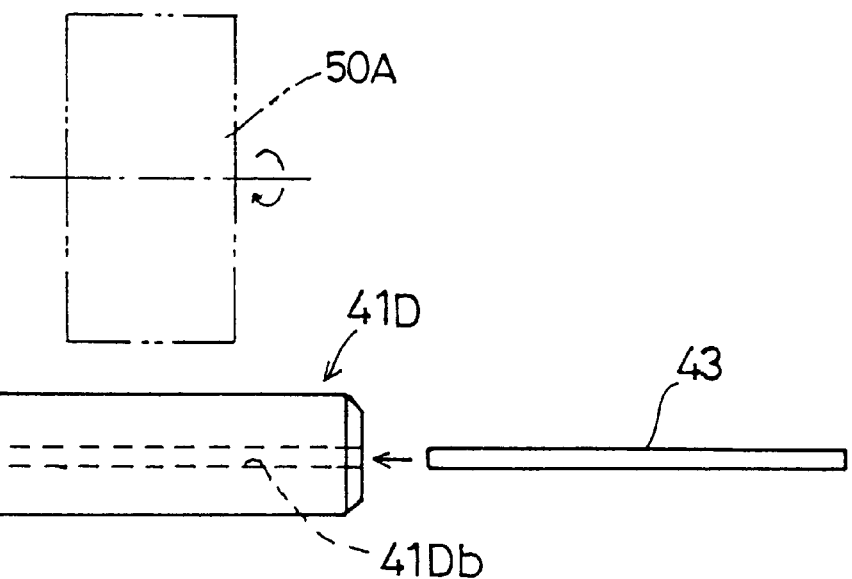
FIGS. 13A–13D are diagrams showing the fabrication process of a ferrule used in the fifth embodiment.
Figure 13B:
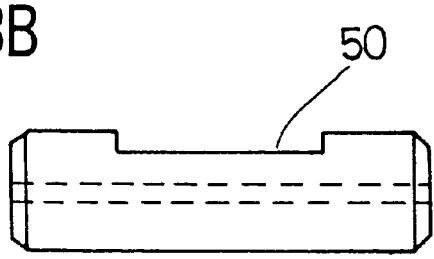

Referring to FIG. 13A, the optical fiber 43 is inserted into the central hole $41D_b$ of a ferrule 41D having a length twice as long as the length of the ferrule 41. The optical fiber 43 is fixed therein by an adhesive. Next, the ferrule 41 thus carrying the optical fiber 43 is held by a jig (not shown), and a rotary grinder 50A is applied to the ferrule 41, to grind away a central part of the ferrule 41 to form a central depression 50 as indicated in FIG. 13B. The central depression 50 thus formed is then polished by a precision polishing apparatus to form a mirror flat surface.

Figure 13C:
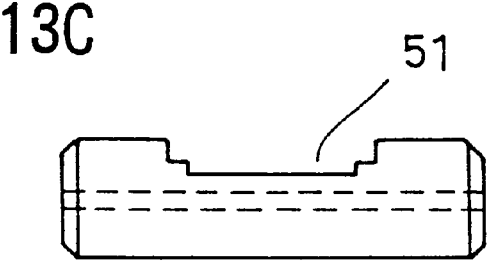

Next, a further grinding process is applied to the foregoing central depression 50 by using a different rotary grinder to form another depression 51 inside the central depression 50 as indicated in FIG. 13C. The depression 51 thus formed is then subjected to a precision polishing process.

Figure 13D:
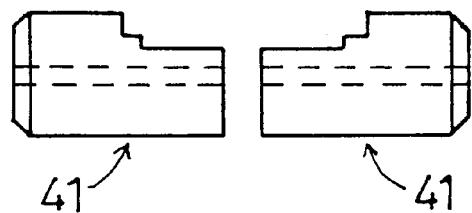

After the step of FIG. 13C, the ferrule 41D is divided in the step of FIG. 13D to form two ferrules 41. By employing the process of FIGS. 13A–13D, it becomes possible to produce the ferrule 41 efficiently.

In the foregoing grinding processes of FIGS. 13B and 13C, it should be noted that both ends of the ferrule 41D are held firmly by the jig not illustrated. Thereby, the deformation or bending of the ferrule 41D is substantially suppressed as compared with the case of holding only one end of the ferrule and applying a grinding process to a free end thereof. By applying a polishing process in each of the steps of FIGS. 13B and 13C after the grinding process, the depressions 50 and 50A are formed with a submicron precision, with minimum amount of polishing. The grinding process and polishing process are advantageously conducted by using a precision grinding apparatus and a precision polishing apparatus. By using zirconia for the material of the ferrule 41D, the risk that the ferrule 41D is broken in the grinding process or polishing process is minimized.

Next, the manufacturing process of the laser diode assembly 42D will be described particularly with reference to the proper positioning of the laser diode 46 on the substrate 45D.

Referring to FIG. 12, it should be noted that the substrate 45D carries alignment marks 52 and 53 at both lateral sides of the proper location of the laser diode 46 defined on the substrate 45D. Further, the laser diode 46 also carries thereon an alignment mark 54 on the laser diode 46. Thereby, a TV camera 55 is used to recognize the alignment marks 52, 53 and 54, and the laser diode 46 is moved to a position in which all the alignment marks 52, 53 and 54 are aligned on a single line L. The laser diode 46 thus positioned is then fixed to the substrate 45D by an adhesive.

Next, the process of assembling the optical fiber assembly 40D by assembling the substrate 45D upon the ferrule 41 will be described with reference to FIG. 11A.

Referring to FIG. 11A, a TV camera 56 is used to recognize the foregoing marks 52 and 53 and further the end surface 43a of the optical fiber 43, and the position of the laser diode assembly 42D with respect to the ferrule 41 is adjusted based upon the result of the image recognition achieved by the TV camera 56. It should be noted that the TV camera 56 recognizes the end surface 43a of the optical fiber 43 based upon the reflection of an illumination beam from the TV camera 56 and reflected at the end surface 43a of the optical fiber 43, or alternatively based upon a visible optical beam injected to the optical fiber from an exterior thereof and exited at the foregoing end surface 43a.

It should be noted that the foregoing assembling process eliminates the need of energizing the laser diode 46, and the efficiency of assembling the optical fiber assembly 40D is substantially improved as compared with the conventional case of wiring the laser diode 46 and adjusting the position thereof for an optimum position while maintaining the energization of the laser diode 40D. Thereby, the cost of the optical fiber assembly 40D is reduced. In addition, the foregoing process is advantageous in that an accurate optical alignment becomes possible between the laser diode 46 and the optical fiber 43 by using the end surface 43a of the optical fiber 43 as an alignment mark.

[SIXTH EMBODIMENT]

Figure 14A:
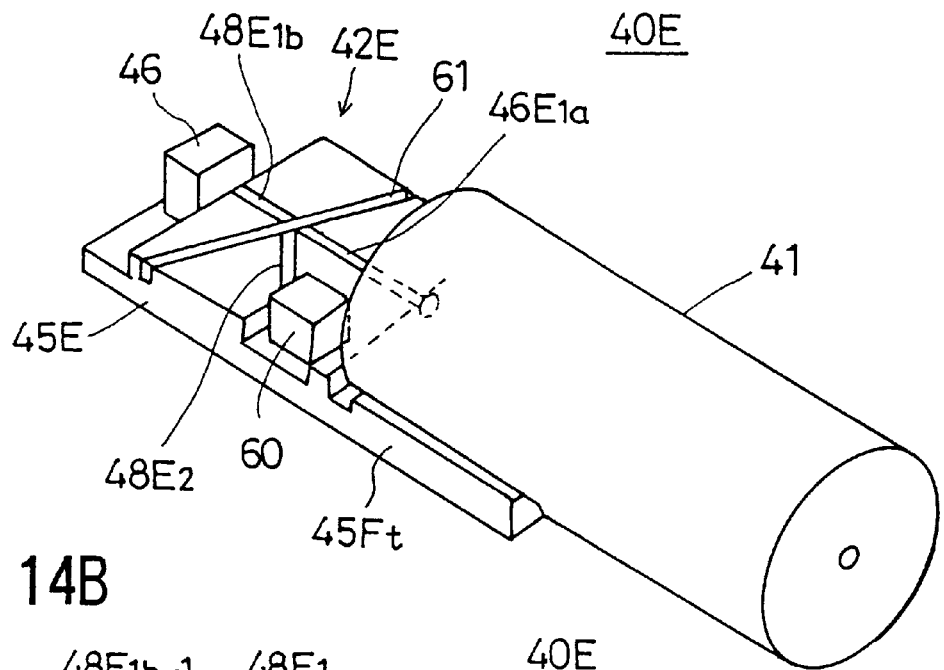
FIGS. 14A–14C are diagrams showing the construction of an optical fiber assembly according to a sixth embodiment of the present invention.
Figure 14B:
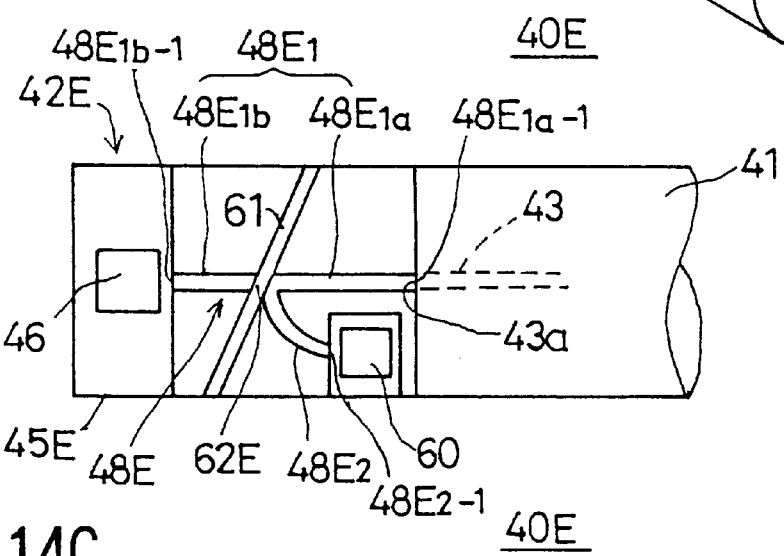
Figure 14C:
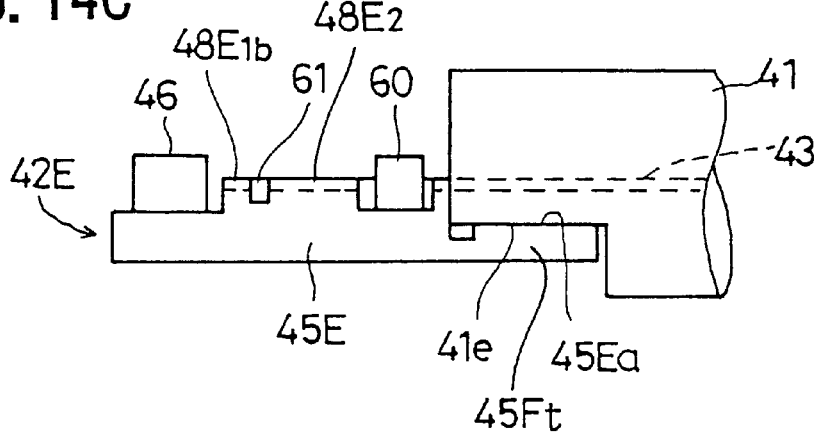
Figure 15:
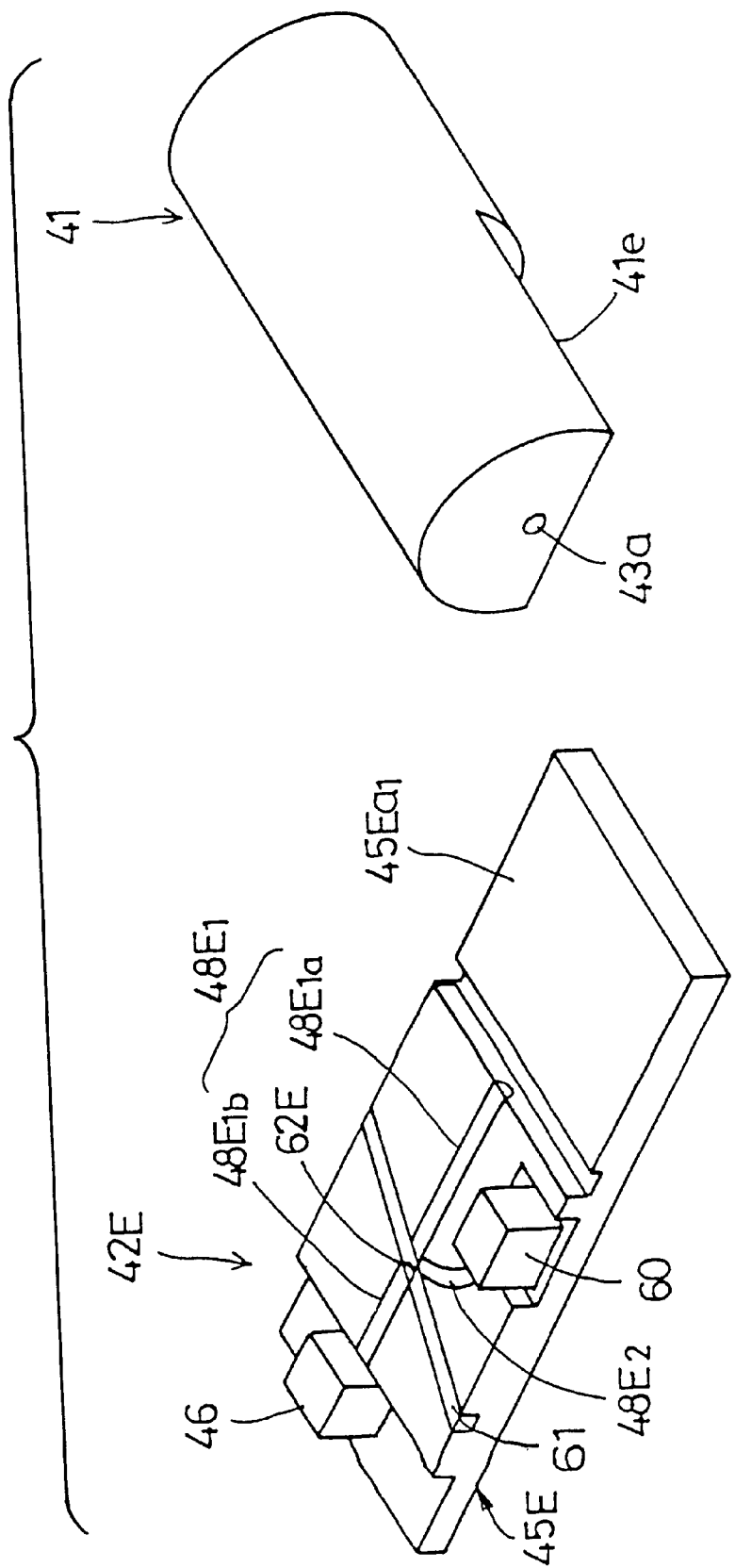
FIG. 15 is another diagram showing the construction of the optical fiber assembly of the sixth embodiment in an exploded view.

FIGS. 14A–14C are diagrams showing the construction of a bidirectional optical fiber assembly 40E according to a sixth embodiment of the present invention. Further, FIG. 15 shows the bidirectional optical fiber assembly 40E in an exploded view. In the drawings, those parts corresponding to the parts described previously are designated by the same reference numerals and the description thereof will be omitted.

Referring to the drawings, the bidirectional optical fiber assembly 40E includes, in addition to the ferrule 41 of FIGS. 4A and 4B, a laser diode assembly 42E, wherein the laser diode assembly 42E includes a substrate 45E carrying thereon the laser diode 46. Further, the substrate 45E carries a photodiode 60 and an optical film 61 that acts as an optical transmission control device.

More specifically, the substrate 45E carries an optical waveguide 48E, wherein optical waveguide 48E includes a first optical branch $48E_1$ and a second optical branch $48E_2$ branched from the first optical branch $48E_1$, and the foregoing optical film 61 extends across a branching node 62E of the optical waveguide 48E obliquely.

It should be noted that the optical waveguide $48E_1$ includes a first part $48E_{1a}$ and a second part $48E_{1b}$ aligned to the first part $48E_{1a}$, and the laser diode 46 is mounted on the substrate 45E such that the laser diode 46 faces an end surface $48E_{1b\text{-}1}$ of the optical waveguide part $48E_{1b}$. Thereby, the laser diode 46 injects an optical beam of a 1.3

μm wavelength into the optical waveguide part $48E_{1b}$. Further, the optical waveguide $48E_{1a}$ has an end surface $48E_{1a-1}$ facing the end surface 43a of the optical fiber 43. The optical film 61 reflects an optical radiation of the 1.55 μm wavelength and transmits an optical radiation of the 1.3 μm wavelength.

It should be noted that the laser diode assembly 42E is mounted on the ferrule 41 by engaging the surface $45E_{a1}$ with the flat cutout surface 41e of the ferrule 41 such that the end surface of the optical waveguide $48E_{1a}$ faces the end surface 43a of the optical fiber 43.

In operation, an optical beam supplied from a remote station along the optical fiber 43 with an optical wavelength of 1.55 μm and carrying an optical signal therewith, is reflected by the optical film 61 after reaching thereto via the optical waveguide $48E_{1a}$, wherein the optical beam thus reflected reaches the photodiode 60 through the optical waveguide $48E_1$. On the other hand, the optical beam of the laser diode 46 produced with the optical wavelength of 1.3 μm, is injected to the optical waveguide $48E_{1b}$ and guided therealong to the optical film 61. The output optical beam then passes through the optical film 61 and, after passing through the optical waveguide 48E, enters the optical fiber 43 held in the ferrule 41. The optical beam is then guided to a remote terminal along the optical fiber 43. Thus, the bidirectional optical fiber assembly 40E of the present embodiment enables a bidirectional optical telecommunication.

[SEVENTH EMBODIMENT]

Figure 16A:
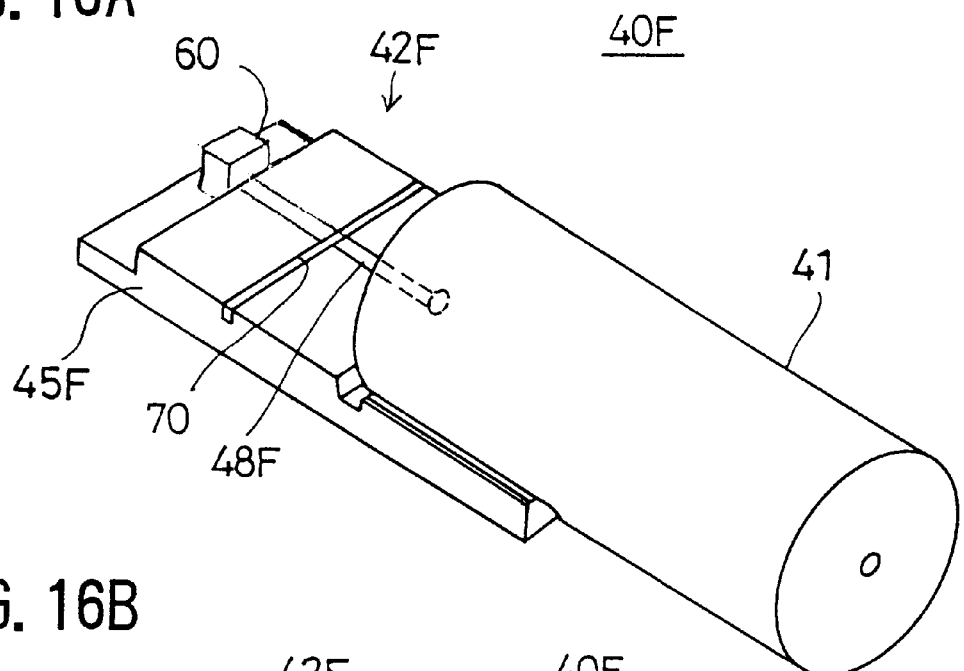
FIGS. 16A–16C are diagrams showing the construction of an optical fiber assembly according to a seventh embodiment of the present invention.
Figure 16B:
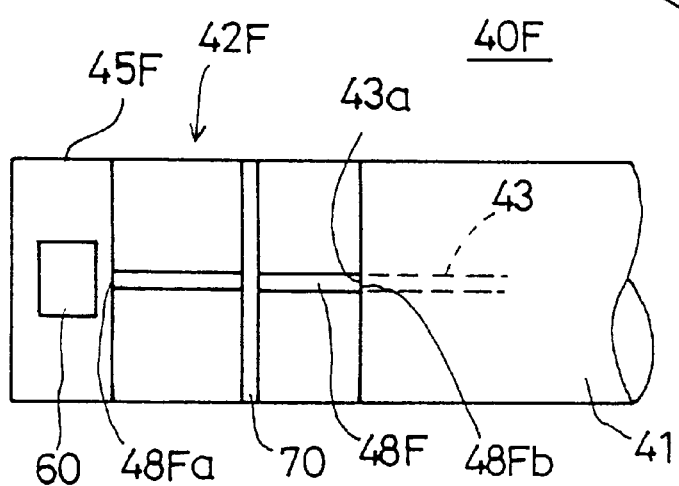
Figure 16C:
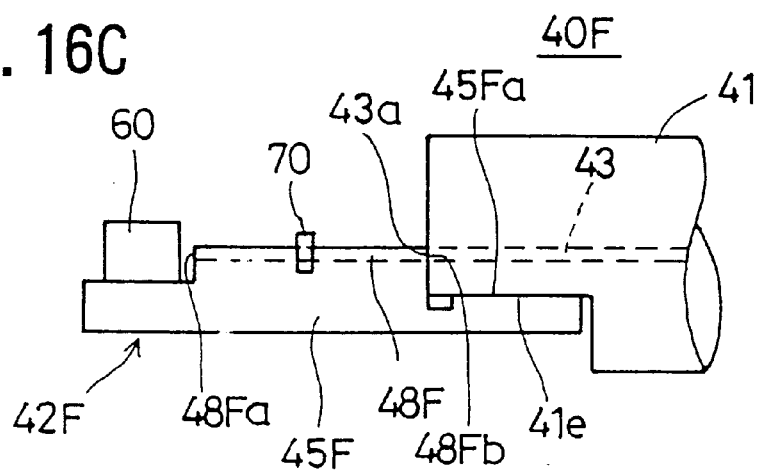

FIGS. 16A–16C show and an optical fiber assembly 40F according to a seven embodiment of the present invention. Further, FIG. 17 shows the optical fiber assembly 40F in an exploded view. In the drawings, those parts corresponding to the parts described previously are designated by the same reference numerals and the description thereof are omitted.

Referring to the drawings, the optical fiber assembly 40F includes, in addition to the ferrule 41 of FIGS. 4A and 4B, a photodiode assembly 42F including a substrate 45F, wherein the substrate 45F carries thereon the photodiode 60 and a filter 70. Further, the substrate 45F carries an optical waveguide 48F in a manner such that a rear end surface $48F_a$ of the optical waveguide 48F faces the photodiode 60 on the substrate 45F. The filer 70 passes an optical beam of a specific wavelength such as the wavelength of 1.55 μm and interrupts optical radiation of other wavelengths. The filter 70 is provided so as to cross the optical waveguide 48F.

It should be noted that the substrate 45F includes a tongue part 45Ft at a front end thereof, and the photodiode assembly 42F is mounted on the ferrule 41 in such a manner that a principal surface $45F_{a1}$ of the tongue part 45Ft engages the flat cutout surface 41e of the ferrule 41. See FIG. 16C. In the state of FIG. 16C, a front end surface $48F_b$ of the optical wave guide 48F faces directly the end surface 43a of the optical fiber 43.

In operation, an optical beam transmitted from a remote station and carrying an optical signal therewith, is passed though the ferrule 41 along the optical fiber 43 and reaches the optical waveguide 48F. The optical beam is then caused to pass through the filter 70, wherein only the optical signal components having a wavelength of 1.55 μm reaches the photodiode 60. While there is a tendency that an optical signal component traveled a long distance experiences a decay in the spectrum, the filter 70 successfully selects the desired signal component of desired wavelength such as 1.55 μm. Thereby, the reception of the optical signal is achieved in the optical fiber assembly 40F with an improved stability.

[EIGHTH EMBODIMENT]

Figure 18A:
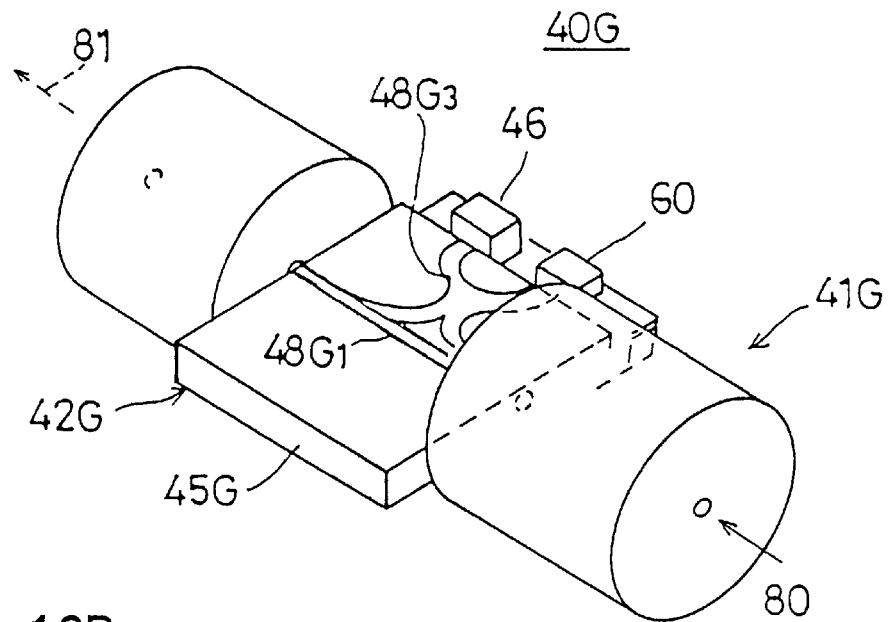
FIGS. 18A–18C are diagrams showing the construction of an optical fiber assembly according to an eighth embodiment of the present invention.
Figure 18B:
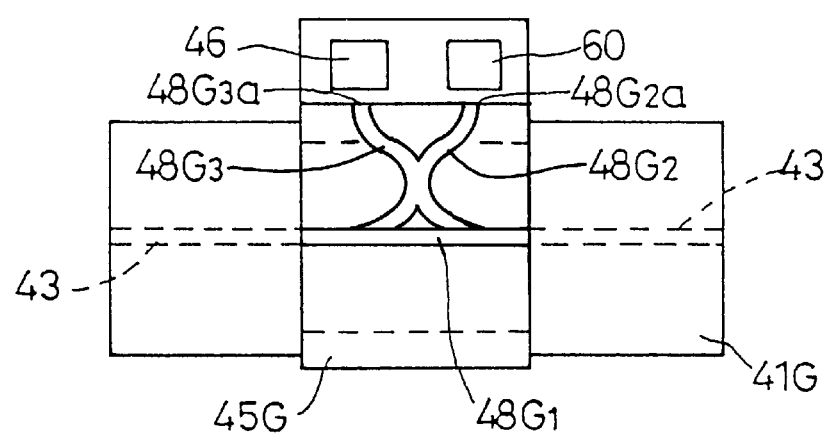
Figure 18C:
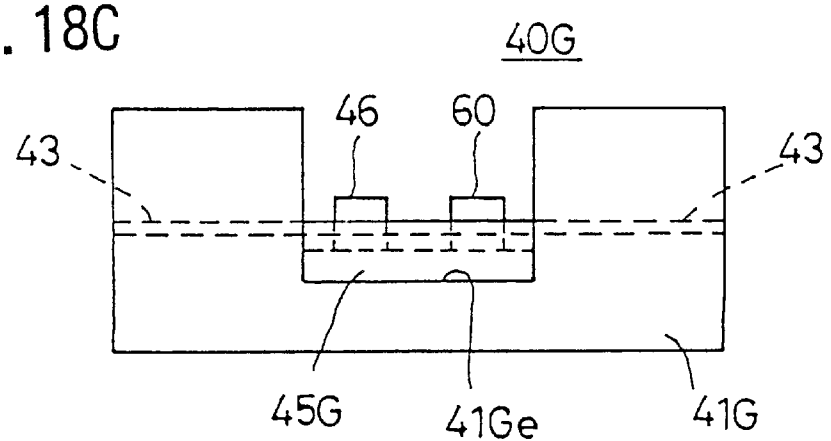

FIGS. 18A, 18B and 18C show an optical fiber assembly 40G according to an eighth embodiment of the present invention, wherein those parts corresponding to the parts described previously are designated by the same reference numerals and the description thereof will be omitted.

Referring to the drawings, the optical fiber assembly 40G includes a ferrule 41G and a laser diode assembly 42G cooperating with the optical fiber assembly 40G, wherein the ferrule 41G includes a flat cutout surface $41G_e$ at an intermediate part of the ferrule 41G for holding thereon a substrate 45G of the laser diode assembly 42G. It should be noted that the cutout surface $41G_e$ is defined by a pair of end surfaces each exposing an end surface of the optical fiber 43.

It should be noted that the laser diode assembly 42G includes the substrate 45G as noted above, wherein the substrate 45G carries thereon an optical waveguide 48G in addition to the laser diode 46 and the photodiode 60. The optical waveguide 48G includes a first, straight optical waveguide $48G_1$ and a pair of second, branched optical waveguides $48G_2$ and $48_3$ branched from the first optical waveguide $48G_1$, wherein the photodiode 60 is provided so as to face an end surface $48G_{2a}$ of the branched optical waveguide $48G_2$ while the laser diode 46 is mounted so as to face an end surface $48G_{3a}$ of the branched optical waveguide $48G_3$.

As noted previously, the substrate 45G is mounted on the flat cutout surface $41G_e$ of the ferrule 41G, such that each edge surface of the optical waveguide $48G_1$ faces a corresponding end surface of the optical fiber 43.

In operation, an optical beam 80 incident to the optical fiber assembly 40G from the right hand side of the construction of FIG. 18A propagates through the branched optical waveguide $48G_2$ and reaches the photodiode 60. In response to this, the laser diode 46 is triggered and an output optical beam is emitted from the laser diode 46 into the branched optical wave guide $48G_3$, wherein the optical beam thus injected is emitted, after traveling through the optical waveguide $48G_3$, from a left hand side of the optical fiber assembly 40G as an output optical signal 81.

[NINTH EMBODIMENT]

Figure 19:
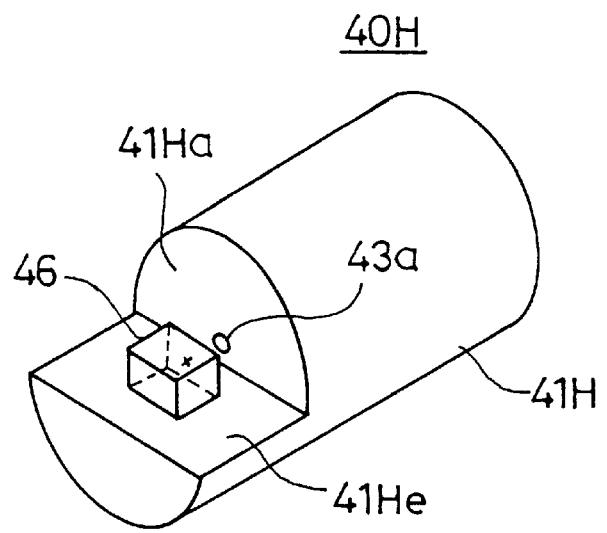
FIG. 19 is another diagram showing the construction of an optical fiber assembly according to a ninth embodiment in an exploded view.

FIG. 19 shows the construction of an optical fiber assembly 40H according to a ninth embodiment of the optical fiber assembly 40H, wherein those parts corresponding to the parts described previously are designated by the same reference numerals and the description thereof will be omitted.

Referring to FIG. 19, the optical fiber assembly 40H includes a ferrule 41H having a tongue part at an end part thereof such that the tongue part is defined by a flat principal surface 41He and a semicircular end surface 41Ha exposing the end surface 43a of the optical fiber 43, wherein the laser diode 46 is mounted on the foregoing flat principal surface 41He of the tongue part. The construction of FIG. 19 is advantageous in the point that the use of a separate substrate for carrying the laser diode 46 can be eliminated.

[TENTH EMBODIMENT]

Figure 20:
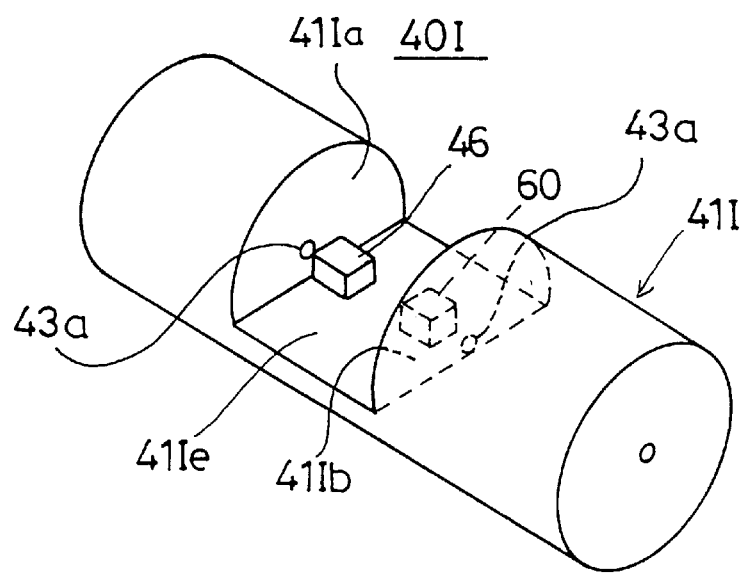
FIG. 20 is another diagram showing the construction of an optical fiber assembly according to a tenth embodiment in an exploded view.

FIG. 20 shows the construction of an optical fiber assembly 40I according to a tenth embodiment of the present invention, wherein those parts corresponding to the parts described previously are designated by the same reference numerals and the description thereof will be omitted.

Referring to FIG. 20, the optical fiber assembly 40I includes an intermediate cutout surface 41e defined by a pair of end surfaces 41Ia and 41Ib, each exposing an end surface 43a of the optical fiber 43. The intermediate cutout surface 41e is a flat surface and carries thereon the laser diode 46 and the photodiode 60.

[ELEVENTH EMBODIMENT]

Figure 21:
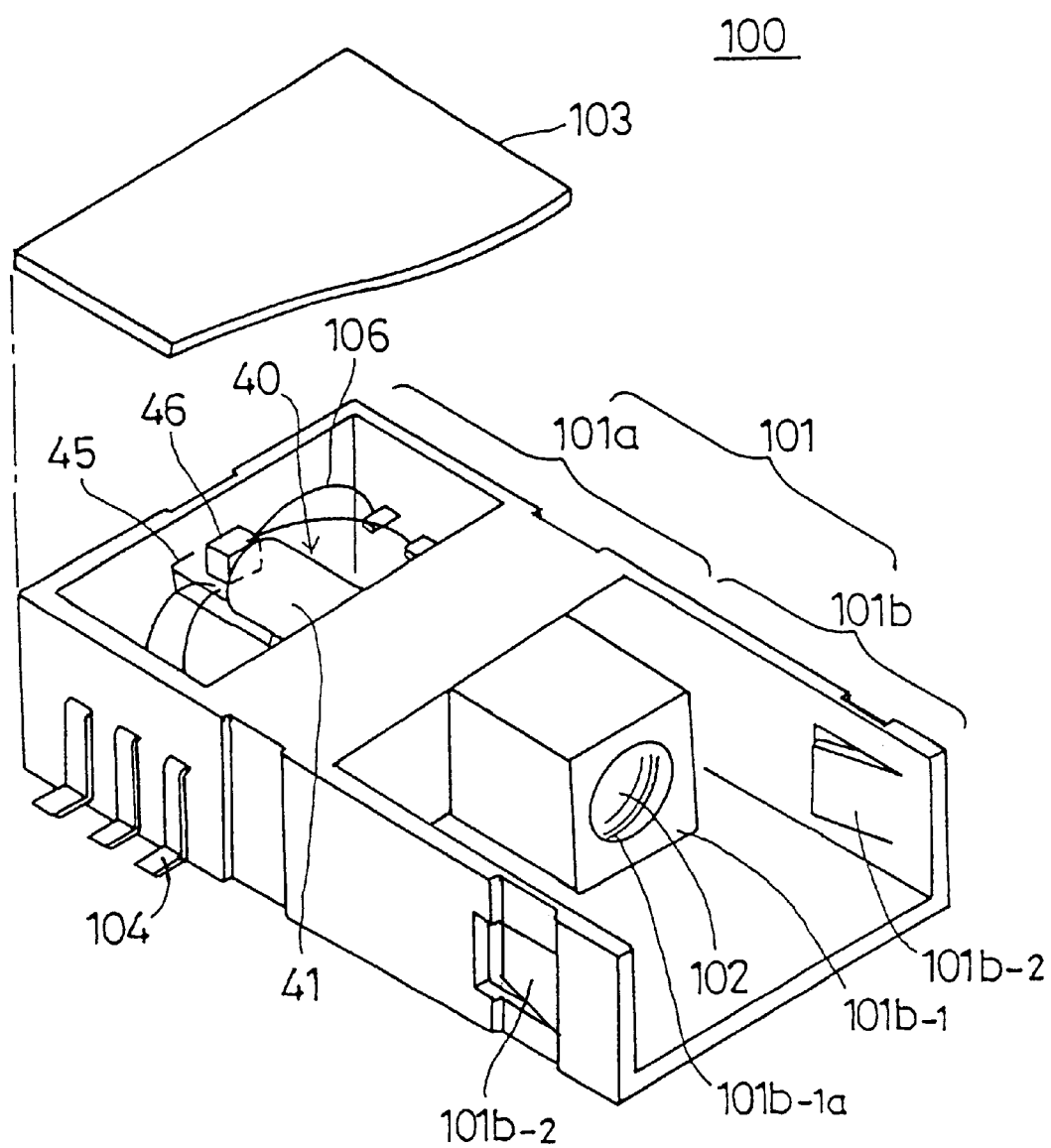
FIG. 21 is a diagram showing the construction of a receptacle-type optical module according to an eleventh embodiment of the present invention in an oblique view.
Figure 22A:
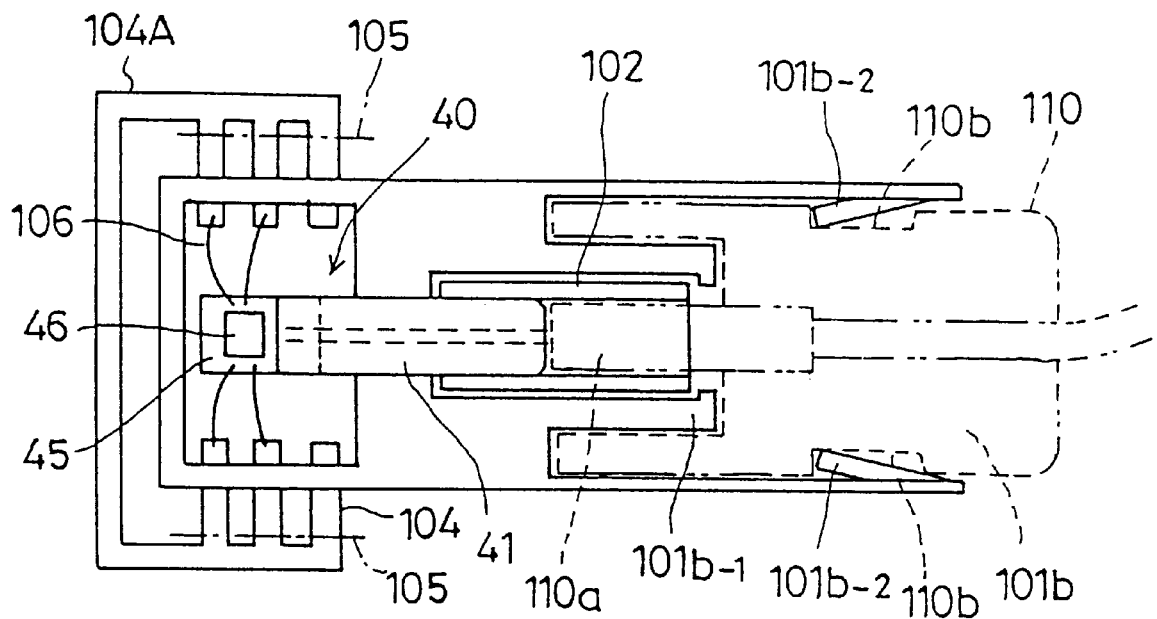
FIGS. 22A and 22B are diagrams showing the optical module of FIG. 21 respectively in a plan view and in a side view.
Figure 22B:
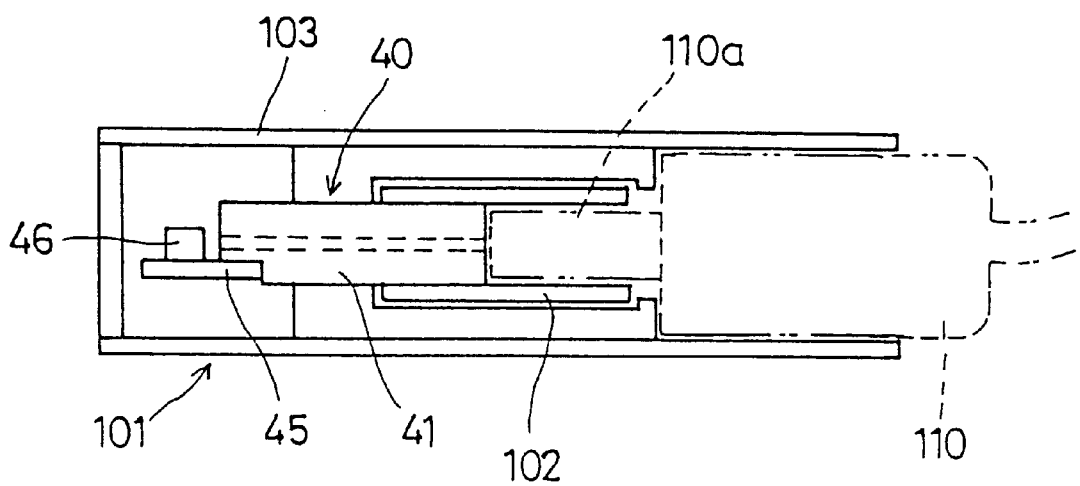

FIG. 21 shows the construction of a receptacle-type optical module 100 according to an eleventh embodiment of the present invention that uses an optical fiber assembly 40 of the first embodiment in an oblique view. Further, FIGS. 22A and 22B show the optical module 100 respectively in a plan view and a side view. In the drawings, those parts corresponding to the parts described previously are designated by the same reference numerals and the description thereof will be omitted.

Referring to the drawings, the optical module 100 includes a housing 101 of a formed resin, wherein the housing 101 includes a first compartment 101a for accommodating the optical fiber assembly 40 and a second compartment 101b for accepting an optical plug connected to an external optical fiber. Further, the housing 101 carries a lid 103.

It should be noted that the ferrule 41 of the optical fiber assembly 40 carries a split sleeve 102 thereon, and the split sleeve 102 accepts therein a ferrule 110a forming a part of a detachable optical plug 110 that carries an external optical fiber, in such a manner that the ferrule 101a inserted into the split sleeve 102 achieves a detachable engagement with the ferrule 41 of the optical fiber assembly 40.

As indicated in FIG. 22A, the second compartment 101b includes a holding member $101b_{-1}$ surrounding the split sleeve 102 and a catch mechanism $101b_{-2}$ for catching the inserted optical plug 110 by engaging a corresponding depression 110b formed on the optical plug 110. It should be noted that the holding member $101b_{-1}$ is formed integrally with the housing 101 and includes an inlet opening $101b_{-1a}$ for accepting the ferrule 110a. The second compartment 101b thereby forms a receptacle compartment.

Further, the housing 101 carries interconnection leads 104 on an outer surface thereof in electrical connection to the laser diode 46 by way of bonding wires 106. In the state of FIG. 22A, it should be noted that the interconnection leads 104 are provided on the housing 110 in the form of a lead frame 104A, wherein the lead frame 104A is molded together with the resin housing 110. By cutting the lead frame 104A along the cutting line 105, the lead frames 104 on the housing 101 are separated from each other.

It should be noted that the optical module 100 of FIG. 21 is mounted on a printed circuit board (not shown) or other suitable mother board by way of a solder reflowing process in the state that the optical plug 110 is not connected thereto. After the optical module 100 is thus mounted, the optical plug 110 is inserted into the receptacle compartment 101b. By pressing the optical plug 110 into the receptacle compartment firmly until the catch mechanism $101b_{-2}$ engages the corresponding depression 110b on the optical plug 110, a firm and reliable optical interconnection is achieved between the optical module 100 and the optical plug 110.

It should be noted that the mechanism for connecting the optical plug 110 to the optical module 100 is by no means limited to the catch mechanism $101b_{-2}$. For example, a screw mechanism may also employed for the same purpose. Further, the optical module 100 may use any of the optical fiber assemblies 40A–40I described previously.

[MODIFICATIONS]

In the description heretofore, it is assumed that the flat cutout surface 41e or corresponding flat cutout surface of the ferrule 41—41I extends parallel to the central axis of the ferrule. However, the present invention is not limited to such a specific angular relationship of the cutout surface, but various modifications are possible particularly in view of suppressing the effect of reflection.

FIGS. 23A–23D show such various modifications as applied to the optical fiber assembly 40A of FIGS. 6A and 6B for eliminating the adversary effect of reflection. In FIGS. 23A–23D, the same laser diode assembly 42A as in the case of the optical fiber assembly 40A is used except that the photodiode 60 is used in place of the laser diode 46 in the examples of FIGS. 23A and 23B.

Figure 23A:
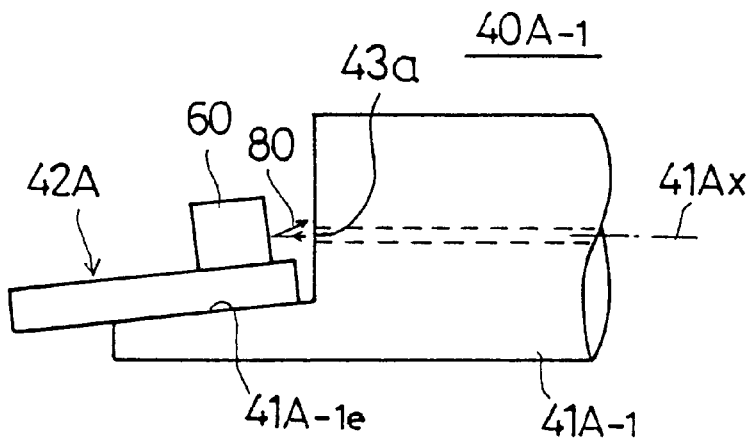
FIGS. 23A–23D are diagrams showing various modifications of the optical fiber assembly of the present invention.

Referring to FIG. 23A showing an optical fiber assembly $40A_{-1}$ using a ferrule $40A_{-1}$, it should be noted that the ferrule $40A_{-1}$ has a flat cutout surface $41A_{-1e}$ inclined intentionally with respect to a central axis $41A_x$ of the ferrule $40A_{-1}$, such that the optical beam of the laser diode 46 hits the end surface 43a of the optical fiber 43 from a slightly lower direction. Thereby, the optical beam 80 emitted from the exposed end surface 43a of the optical fiber 43 and reflected by the edge surface of the photodiode 60 misses the foregoing end surface 43a, and the effect of the reflection of the optical beam is minimized.

Figure 23B:
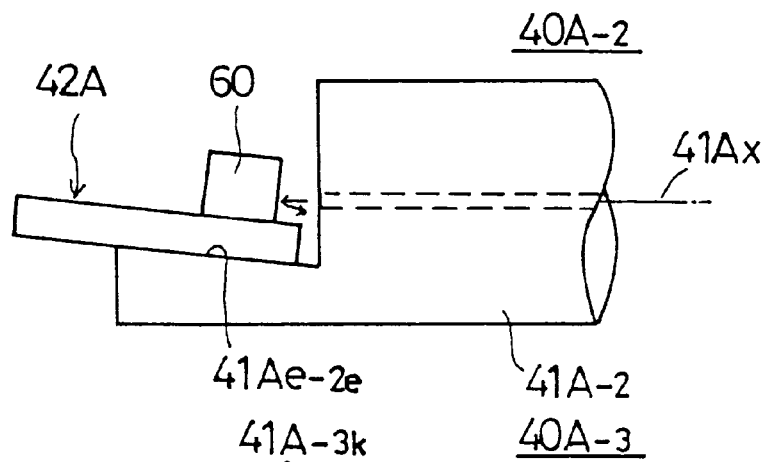

FIG. 23B shows an optical fiber assembly $40A_{-2}$ using a ferrule $40A_{-2}$. In the example of FIG. 23B, it should be noted that the ferrule $40A_{-2}$ has a flat cutout surface $41A_{-2e}$ inclined intentionally with respect to a central axis $41A_x$ of the ferrule $40A_{-2}$, such that the optical beam of the laser diode 46 hits the end surface 43a of the optical fiber 43 from a slightly upward direction. In this case, too, the optical beam emitted from the exposed end surface 43a of the optical fiber 43 and reflected by the edge surface of the photodiode 60 misses the foregoing end surface 43a, and the effect of the reflection of the optical beam is minimized.

Figure 23C:
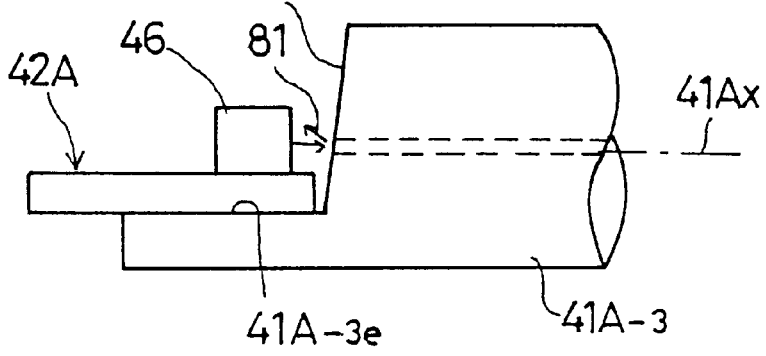

FIG. 23C shows an optical fiber assembly $40A_{-3}$ using a ferrule $40A_{-2}$ in combination with the laser diode 46. In the example of FIG. 23C, it should be noted that the ferrule $40A_{-3}$ has a flat cutout surface $41A_{-3e}$ extending parallel to the central axis $41A_x$ of the ferrule $40A_{-3}$, while an end surface $41A_{-3k}$ of the ferrule $40A_{-3}$ is inclined from a plane vertical to the foregoing central axis $41A_x$. Thereby, the optical beam emitted from the laser diode 46 and reflected by the end surface $41A_{-3k}$ misses the active region of the laser diode 46, and the effect of the reflection is minimized.

Figure 23D:
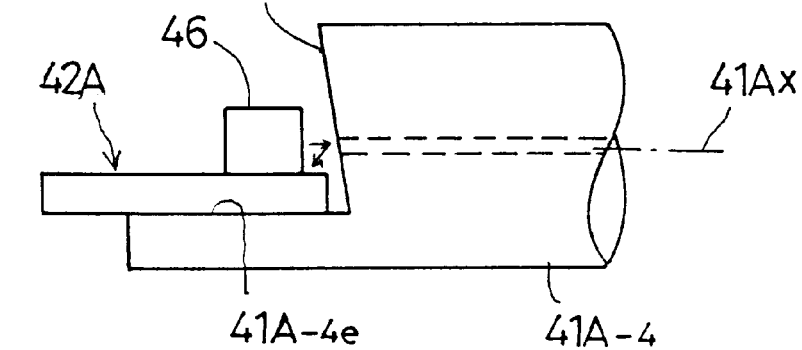

FIG. 23D shows an optical fiber assembly $40A_{-4}$ according to a modification of the optical fiber assembly $40A_{-3}$ of FIG. 23C that uses a ferrule $41A_{-4}$ in place of the ferrule $41A_{-3}$, wherein the ferrule $41A_{-4}$ has an end surface $41A_{-4k}$ inclined in an opposite direction to the inclined end surface $41A_{-3k}$.

FIGS. 24A–24E show the process of forming the ferrule 41A used in the embodiment of FIGS. 6A and 6B, wherein those parts corresponding to the parts described previously are designated by the same reference numerals and the description thereof will be omitted.

Referring to FIG. 24A, the optical fiber 43 is inserted into the central hole $41D_b$ of the ferrule 41 in the step of FIG. 24A and a rotary grinder 50A is applied to the ferrule 41 to grind away a central part of the ferrule 41 to form a central depression 50A as indicated in FIG. 24B. The central depression 50A thus formed is polished by a precision polishing apparatus to form a mirror flat top surface.

Next, a further grinding process is applied to the foregoing central depression 50A by using a different rotary grinder to form another depression 51A inside the central depression 50 as indicated in FIG. 24C such that the depression 51A crosses the central hole $41D_b$. The depression 51A thus formed is also subjected to a precision polishing process.

Next, a pair of grooves 52 are formed at both ends of the depression 51A in the step of FIG. 24D, and the ferrule 41D thus processed is divided in the step of FIG. 24E to form two ferrules 41. By employing the process of FIGS. 24A–24E, it becomes possible to produce the ferrule 41D efficiently.

What is claimed is:

1. An optical fiber assembly, comprising:

a substrate having a principal surface;

an optical device provided on said substrate; and a ferrule carrying an optical fiber, said ferrule being defined by a circumferential surface, said ferrule including a cutout part on said circumferential surface, said cutout part including a flat cutout surface formed on said circumferential surface so as to extend in an axial direction of said ferrule and a cutout end surface exposing an end surface of said optical fiber such that said cutout end surface and said end surface forms a flush surface, said substrate being mounted on said flat cutout surface such that said principal surface engages said flat cutout surface wherein said optical device is mounted on said principal surface of said substrate.

2. An optical fiber assembly as claimed in claim 1, wherein said cutout part is defined by said flat cutout surface and said cutout end surface extending from said circumferential surface generally in a radial direction toward an axial center of said ferrule, said cutout end surface exposing said end surface of said optical fiber held in said ferrule, said flat cutout surface being formed such that said optical device on said substrate aligns optically to said exposed end surface of said optical fiber.

3. An optical fiber assembly as claimed in claim 2, wherein said cutout end surface and said optical device are optically interconnected by a resin.

4. An optical fiber assembly as claimed in claim 2, wherein said cutout flat surface and said cutout end surface forms an angle exceeding 90°.

5. An optical fiber assembly as claimed in claim 2, wherein said cutout flat surface and said cutout end surface forms an angle smaller than 90°.

6. An optical fiber assembly as claimed in claim 1, wherein said substrate carries a first alignment mark on a surface thereof that supports said optical device, and wherein said optical device carries a second alignment mark.

7. An optical fiber assembly as claimed in claim 1, wherein a cutout is provided at an end of said ferrule.

8. An optical fiber assembly, comprising:

a substrate having a principal surface;

an optical device provided on said substrate;

a ferrule carrying an optical fiber, said ferrule being defined by a circumferential surface;

said ferrule including a cutout part on said circumferential surface, said cutout part including a flat cutout surface formed on said circumferential surface so as to extend in an axial direction of said ferrule; and said substrate being mounted on said flat cutout surface such that said principal surface engages said flat cutout surface;

wherein said optical device is mounted on a surface different from said principal surface of said substrate.

9. An optical fiber assembly as claimed in claim 8, wherein a groove is formed on said ferrule between said principal surface and an end surface of said cutout part.

10. An optical fiber assembly as claimed in claim 8, wherein said different surface is offset from said principal surface in a direction perpendicular to said principal surface.

11. An optical fiber assembly as claimed in claim 8, wherein said different surface is a rear surface of said substrate opposite to said principal surface.

12. An optical fiber assembly, comprising:

a substrate having a principal surface;

an optical device provided on said substrate; and a ferrule carrying an optical fiber, said ferrule being defined by a circumferential surface, said ferrule including a cutout part on said circumferential surface, said cutout part including a flat cutout surface formed on said circumferential surface so as to extend in an axial direction of said ferrule and a cutout end surface exposing an end surface of said optical fiber such that said cutout end surface and said end surface forms a flush surface, said substrate being mounted on said flat cutout surface such that said principal surface engages said flat cutout surface, wherein said substrate carries an optical waveguide such that said optical waveguide is in alignment with said optical fiber in said ferrule and said optical device.

13. An optical fiber assembly as claimed in claim 12, wherein said optical waveguide is provided on a surface different from said principal surface.

14. An optical fiber assembly as claimed in claim 12, wherein said optical waveguide defines said principal surface.

15. An optical fiber assembly as claimed in claim 12, wherein said optical waveguide includes first and second branches branched from a common trunk that is aligned optically to said optical fiber, said optical device on said substrate includes a light emitting device and a photodetection device, said light emitting device being in optical alignment with said first branch, said photodetection device being in optical alignment with said second branch.

16. An optical fiber assembly as claimed in claim 15, wherein said optical waveguide further includes an optical switch for switching an optical path through said trunk between said first branch and said second branch.

17. An optical fiber assembly as claimed in claim 12, wherein said ferrule is defined by a first end surface and a second, opposite end surface, and wherein a cutout is provided at a part intermediate between said first and second end surfaces of said ferrule.

18. An optical fiber assembly, comprising:

a substrate having a principal surface;

an optical device provided on said substrate; and a ferrule carrying an optical fiber, said ferrule being defined by a circumferential surface, said ferrule including a cutout part on said circumferential surface, said cutout part including a flat cutout surface formed on said circumferential surface so as to extend in an axial direction of said ferrule, said substrate being mounted on said flat cutout surface such that said principal surface engages said flat cutout surface, and said cutout part being defined by said flat cutout surface and further by a cutout end surface extending from said circumferential surface generally in a radial direction toward an axis center of said ferrule, said cutout end surface exposing an end surface of said optical fiber held in said ferrule, said flat cutout surface being formed such that said optical device on said substrate aligns optically to said exposed end surface of said optical fiber, wherein said substrate includes a substrate end surface abutting said cutout end surface of said ferrule.

19. An optical fiber assembly, comprising:

a substrate defined by first and second, mutually opposing principal surfaces;

an optical device provided on said substrate; and a ferrule having an end surface and carrying therein an optical fiber, said ferrule having a cut-in part on said end surface, said cut-in part being defined by a pair of mutually parallel surfaces and a rear surface exposing an end surface of said optical fiber, said rear surface extending in an axial direction of said ferrule;

said substrate being inserted into said cut-in part such that said first and second principal surfaces of said substrate engage said parallel surfaces of said cut-in part respectively, said optical device and said exposed end surface of said optical fiber being aligned optically.

20. An optical fiber assembly as claimed in claim 19, wherein said optical device is provided on a surface different from any of said first and second principal surfaces.

21. An optical fiber assembly as claimed in claim 19, wherein said substrate carries thereon an optical waveguide in optical alignment with said optical device and said exposed end surface of said optical fiber.

22. An optical module, comprising:

a housing including a first region and a second region; and an optical assembly accommodated in said first region of said housing, said optical assembly comprising:

a substrate having a principal surface;

an optical device provided on said substrate;

a ferrule carrying an optical fiber, said ferrule being defined by a circumferential surface, said ferrule including a cutout part on said circumferential surface, said cutout part including a flat cutout surface formed on said circumferential surface so as to extend in an axial direction of said ferrule, said substrate being mounted on said flat cutout surface such that said principal surface engages said flat cutout surface, said optical device being mounted on said substrate at a side thereof where said principal surface of said substrate is provided;

a holder member provided on said second region of said housing, said holder member holding a second end of said ferrule including a second end surface and adapted to hold another ferrule provided at an end of an external optical fiber in an abutting engagement with said second end surface; and electrical contacts provided on said housing for external connection, said second region of said housing including an opening adapted for accepting an optical plug carrying said another ferrule and said external optical fiber, said second region of said housing guiding said optical plug inserted into said opening.

23. A method of manufacturing an optical assembly, said optical assembly comprising:

a substrate having a principal surface;

an optical device provided on said substrate;

a ferrule carrying an optical fiber, said ferrule being defined by a circumferential surface, said ferrule including a cutout part on said circumferential surface, said cutout part including a flat cutout surface formed on said circumferential surface so as to extend in an axial direction of said ferrule, said substrate being mounted on said flat cutout surface such that said principal surface engages said flat cutout surface;

said method further comprising:

mounting said optical device on said principal surface of said substrate and mounting said substrate on said ferrule such that said flat surface of said ferrule engages said principal surface of said substrate;

said mounting said optical device comprising:

recognizing a positioning mark on said substrate and a positioning mark on said optical device by way of a first image recognition process; and positioning said optical device with respect to said substrate based upon a result of said first image recognition process; and said mounting said substrate on said ferrule comprising:

recognizing said positioning mark on said substrate and an end of said optical fiber held by said ferrule by way of a second image recognition process; and positioning said ferrule with respect to said substrate based upon a result of said image recognition process.

24. An optical fiber assembly, comprising:

a substrate having an optical device mounted on a principal surface of the substrate; and a ferrule having a first end and a second end and carrying an optical fiber, the ferrule including a cutout part on the first end, the cutout part including a flat cutout surface so as to extend in an direction parallel to the optical fiber and a cutout end surface exposing an end surface of said optical fiber such that said cutout end surface and said end surface forms a flush surface, wherein the substrate is mounted on the flat cutout surface such that the principal surface of the substrate engages the flat cutout surface of the ferrule, and the optical device is in optical alignment with the optical fiber.

25. A method of mounting an optical device in alignment with an optical fiber, comprising:

fixing an optical device on a principal surface of a substrate;

locating an optical fiber at least partially within a ferrule, the ferrule having a first end and a second end;

removing a portion of the first end of the ferrule so as to create a cutout part of the ferrule and to create a flat cutout surface of the ferrule extending in a direction parallel to the optical fiber, wherein said cutout part is defined by a cutout end surface that exposes an end surface of the optical fiber such that said cutout end surface and said end surface forms a flush surface; and mounting the substrate on the flat cutout surface such that the principal surface of the substrate engages the flat cutout surface of the ferrule, and the optical device is in optical alignment with the optical fiber.

* * * * *

UNITED STATES PATENT AND TRADEMARK OFFICE
CERTIFICATE OF CORRECTION

PATENT NO. : 6,217,231 B1
DATED : April 17, 2001
INVENTOR(S) : Akitoshi Mesaki et al.

It is certified that error appears in the above-identified patent and that said Letters Patent is hereby corrected as shown below:

Column 17,
Line 12, begin a new paragraph with "said ferrule";
Line 20, begin a new paragraph with "said optical";
Line 53, begin a new paragraph with "said second".

Signed and Sealed this

Eleventh Day of December, 2001

Attest:

*Attesting Officer*

NICHOLAS P. GODICI
*Acting Director of the United States Patent and Trademark Office*